US012757036B2

(12) United States Patent
Merono Vazquez et al.

(10) Patent No.: US 12,757,036 B2
(45) Date of Patent: Oct. 6, 2026

(54) PROGRESSIVE DISCOVERY FOR ROUTING TO A GROUP OF NETWORK FUNCTIONS

(71) Applicant: Telefonaktiebolaget LM Ericsson (publ), Stockholm (SE)

(72) Inventors: Emilano Merono Vazquez, Madrid (ES); Pablo Acevedo Montserrat, Galapagar (ES); Maria Carmen Belinchon Vergara, Getafe (ES); Jesus Angel De Gregorio Rodriquez, Madrid (ES); Xin Yu Zhang, Shanghai (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 604 days.

(21) Appl. No.: 18/021,857

(22) PCT Filed: Aug. 31, 2021

(86) PCT No.: PCT/EP2021/074033
§ 371 (c)(1),
(2) Date: Feb. 17, 2023

(87) PCT Pub. No.: WO2022/038301
PCT Pub. Date: Feb. 24, 2022

(65) Prior Publication Data

US 2024/0015683 A1 Jan. 11, 2024

(51) Int. Cl.
*H04W 24/02* (2009.01)
*H04L 41/0893* (2022.01)
(Continued)

(52) U.S. Cl.
CPC ........... *H04W 24/02* (2013.01); *H04W 8/186* (2013.01); *H04W 60/04* (2013.01); *H04L 41/0893* (2013.01)

(58) Field of Classification Search
CPC ..... H04W 24/02; H04W 8/186; H04W 60/04; H04W 60/00; H04W 8/18; H04W 48/18; H04W 88/14; H04L 41/0893
See application file for complete search history.

(56) References Cited

U.S. PATENT DOCUMENTS

2023/0078778 A1* 3/2023 Kuravangi-Thammaiah ............... H04W 8/18 455/418
2024/0073092 A1* 2/2024 Peuziat ............. H04W 41/0893
2024/0357481 A1* 10/2024 Hua ....................... H04W 76/10

FOREIGN PATENT DOCUMENTS

WO 2019072058 A1 4/2019

OTHER PUBLICATIONS

Perdigão, André, José Quevedo, and Rui L. Aguiar. "Is release 15 ready for the industry?. " IEEE Access 12 (2024): 17651-17668. (Year: 2024).*

(Continued)

*Primary Examiner* — Sharad Rampuria
(74) *Attorney, Agent, or Firm* — Sage Patent Group

(57) ABSTRACT

An access and mobility management function, AMF, entity receives an initial registration request from a communication device and transmits, responsive thereto, a network function, NF, discovery request to a network function repository function, NRF, entity, the NF discovery request including a communication device identifier and an NF type identifier. The NRF entity matches the communication device identifier with one of a plurality of communication device identifier ranges configured by the NRF entity, extracts a group identifier, groupId, configured for the one of the plurality of communication device identifier ranges, builds a list of registered NF profiles matching the NF type identifier and registered with the groupId, and transmits the list of registered NF profiles including the groupId and a NRF mapping indication to the AMF entity.

9 Claims, 25 Drawing Sheets

(51) Int. Cl.
*H04W 8/18* (2009.01)
*H04W 60/04* (2009.01)

(56) References Cited

OTHER PUBLICATIONS

Jeon, Youbin, et al. "A distributed NWDAF architecture for federated learning in 5G." 2022 IEEE International Conference on Consumer Electronics (ICCE). IEEE, 2022. (Year: 2022).*

International Search Report and Written Opinion of the International Searching Authority, PCT/EP2021/074033, mailed Mar. 15, 2022, 24 pages.

3GPP TS 23.502 v16.5.0 (Jul. 2020); 3rd Generation Partnership Project; Technical Specification Group Services and System Aspects; Procedures for the 5G System (5GS); Stage 2 (Release 16), 594 pages.

Nokia et al., "UDM (UDR, AUSF, PCF, CHF) profile without subscriber identifiers," 3GPP TSG-CT WG4 Meeting #99e, C4-204204, E-Meeting, Aug. 18-28, 2020, 5 pages.

Nokia et al., "Group ID in Discovery Request," 3GPP TSG CT WG4 Meeting #86, C4-186479, West Palm Beach, US, Aug. 20-24, 2018, 7 pages.

3GPP TS 23.501 v16.3.0 (Dec. 2019); 3rd Generation Partnership Project; Technical Specification Group Services and System Aspects; System architecture for the 5G System (5GS); Stage 2 (Release 16), 417 pages.

3GPP TS 23.502 v16.3.0 (Dec. 2019; 3rd Generation Partnership Project; Technical Specification Group Services and System Aspects; Procedures for the 5G System (5GS); Stage 2 (Release 16), 558 pages.

* cited by examiner

PROGRESSIVE DISCOVERY FOR ROUTING TO A GROUP OF NETWORK FUNCTIONS

CROSS REFERENCE TO RELATED APPLICATIONS

This application is a 35 U.S.C. § 371 national stage application of PCT International Application No. PCT/EP2021/074033 filed on Aug. 31, 2021, which in turn claims domestic priority to U.S. Provisional Patent Application No. 63/068,365 filed on Aug. 20, 2020, the disclosures and content of which are incorporated by reference herein in their entirety.

TECHNICAL FIELD

The present disclosure relates generally to communications, and more particularly to communication methods and related devices and nodes supporting wireless communications.

BACKGROUND

NRF (Network Function Repository Function) is a 3GPP entity which stores the information for the different network function (NF) types in the 5GC (5th Generation Core) network (e.g. unified data management network function (UDM NF), access and mobility management function network function (AMF NF), user and data repository network function (UDR NF).

Each NF type is instanced based on the deployment type/needs. Each NF instance (e.g. UDR-instance-1, UDR-instance-2, UDM-instance-1, etc.) registers/stores its own NF information in NRF, which information is called a NF profile. This NF profile may include the ranges of users being served by the NF instance. Users are identified in the 5GC network with the SUPI (Subscription Permanent Identifier), which is unique per user.

This way, if an NF instance registers information about SUPI ranges being served, e.g.

UDM-instance-1 registers in NRF SUPI-range-1-> from 111111110 to 111111114, SUPI-range-2-> from 211111115 to 211111119

UDM-instance-2 registers in NRF SUPI-range-1-> from 111111115 to 111111119, SUPI-range-2-> from 211111110 to 211111114)

This NF information is read/discovered by an NF consumer of the services offered by a given NF type (e.g. UDM) so that the service request is sent to the proper NF service producer serving the related SUPI, e.g. an AMF may contact the NRF to read/discover all NFs of type UDM, and the NRF will return the NF profiles registered by each UDM instance. If the AMF receives a request from user-1 (SUPI-1=1111111101234), AMF will perform a lookup against the UDM profiles received from the NRF and it will select the proper UDM instance (in this case, UDM-instance-1, since SUPI-1 matches its SUPI-range-1).

Accordingly, the AMF will store each NF service producer profile discovered (e.g. UDM, AUSF) in its cache, each profile containing the SUPI ranges being served by each NF type/instance. Note that there might be several (or many) instances serving the same set of users (i.e. same SUPI ranges) for load sharing and failover purposes. Each NF profile is to be stored separately per instance, no matter whether or not they serve the same users.

Another alternative for this SUPI-based routing from an NF service consumer is that the NF service producers, instead of registering the SUPI ranges they are serving, they simply register/store in NRF a Group Identifier as part of its NF profile (e.g. UDM registers "udm-group-id-1", UDR registers "udr-group-id-1"). The association between the SUPI ranges and the Group ID is then configured in NRF, e.g.

UDM-instance-1 registers in NRF "udm-group-id-1"

UDM-instance-2 registers in NRF "udm-group-id-2"

NRF has this information configured:

"udm-group-id-1" serves SUPI-range-1-> from 111111110 to 111111114, SUPI-range-2-> from 211111115 to 211111119

"udm-group-id-2" serves SUPI-range-1-> from 111111115 to 111111119, SUPI-range-2-> from 211111110 to 211111114)

In this second alternative, the AMF will query NRF to discover the NF instances of a given type (e.g. UDM) for a given SUPI (e.g. SUPI-2=2111111101234). NRF will match the SUPI received to SUPI-range-2 in "udm-group-id-2" and it will respond AMF by including UDM-instance-2 (since it is the NF of type UDM which has registered the related Group ID). The AMF will then store, as part of the user-2 context, the GroupID and the list of UDM instances associated to the GroupId. That is, the AMF stores in its cache that "udm-group-id-2" is composed by UDM-instance-2. Additionally, while user-2 is registered, AMF stores, as part of the UE context/SUPI, the GroupId ("udm-group-id-2"), so that it is associated to the SUPI for subsequent requests.

This second alternative is supposed to be used by many operators since there is only a single point of configuration for the SUPI ranges, which is NRF. That is, instead of configuring the same information (i.e. the same SUPI ranges) in each NF profile for several (or many) NF instances of a given type, the information is just configured once in NRF and the related NF instances are simply configured with a Group ID which points at a list of SUPI ranges configured locally in NRF. This alternative also avoids sending and registering a large (in terms of size) NF profile per instance when the number of SUPI ranges being served by the NF instance is quite high.

In short: although both alternatives will be used, it is foreseen that the second one will be preferable in many deployments for the reasons described above.

SUMMARY

Problems with NRF Mapping

As can be seen in FIG. 1, the NRF is contacted each and every time by the consumer NF (e.g., UDM) to fetch the list of target instances (service producers) for each and every SUPI. Even for stateful NFs (e.g., an AMF) storing the GroupId for the SUPI, if the wireless device (e.g., UE) is de-registered, then NRF is contacted again when the wireless device registers again in the network to discover the NF instances serving the SUPI. The contacting of the NRF each and every time makes the signaling complex and non-efficient since the NRF is forced to perform SUPI ranges lookup/matching for any NF consumer discovering the NF instances per every request. This is done for each and every SUPI in the network.

Problems for NF Profile Lookups

The size of the NF profiles to be registered can be dramatically large if there are a lot of SUPI ranges. For example, some operators like China Mobile are known to have around 5,000 SUPI ranges per UDM/UDR groups. For each and every request, the NF consumer (e.g. AMF, UDM) is forced to perform SUPI ranges lookup against each and every NF profile discovered, to build a list of selectable target NFs (NF service producers). This is done on a per request received basis. Overall, this requires a lot of storage in NRF, a lot of cache memory in AMF to host all NF instances including all the SUPI ranges registered by each NF. Moreover, the impacts in performance/computing when it comes to performing lookups with thousands of ranges can be dramatic. If there are, e.g. 20 NF instances, each registering 5.000 SUPI ranges in its profile, that makes 100.000 SUPI ranges to lookup before deciding the target NF instance to send the request. This is done for each and every request to be sent.

According to the invention, there is provided a method performed by a network function repository function, NRF, entity, the method comprising receiving a network function, NF, discovery request from an access and mobility management function, AMF, entity, the NF discovery request having a communication device identifier and a NF type identifier, matching the communication device identifier with one of a plurality of communication device identifier ranges configured by the NRF entity, extracting a group identifier, groupId, configured for the one of the plurality of communication device identifier ranges, building a list of registered NF profiles matching the NF type identifier and registered with the groupId, and transmitting the list of registered NF profiles including the groupId and a NRF mapping indication to the AMF entity.

There is further provided a network function repository entity configured to perform operations according to this method.

There is further provided a method performed by an access and mobility management function, AMF, entity, the method comprising transmitting, responsive to receiving an initial registration request from a communication device, a network function, NF, discovery request to a network function repository function, NRF, entity, the NF discovery request comprising a communication device identifier and a NF type identifier, and receiving a list of registered NF profiles including the groupId and a NRF mapping indication indicating that the mapping of communication device identifier ranges to the groupId is performed by the NRF entity.

There is further provided an access and mobility management function entity configured to perform operations according to this method.

There is further provided a method performed by a unified data management, UDM, entity, the method comprising receiving, from an access and mobility management function, AMF, entity, a communication device initial registration having a communication device identifier, selecting, regardless of the communication device identifier, one of one or more user and data repository, UDR, entities registered in a network function repository function, NRF, entity having a same group identifier, groupId, as the groupId of the UDM entity, and transmitting to the AMF entity a registration acknowledgement having the groupId and an indication of the one of the one or more UDR entities.

There is further provided a unified data management entity configured to perform operations according to this method.

Further, there are provided computer programs comprising instructions which, when performed by a processor or processing circuitry of one of these entities, cause the respective entity to perform operations according to the respective method.

It is noted that the term "entity" refers to any embodiment in which the respective functionality is implemented. This may for example be in a localized manner, wherein the functionality resides in a specific place and/or is tied to specific hardware, such as one or more processors, memory and the like. In such case, it may also be denoted a "node". In another example, it may be implemented in a virtualized manner, as known by the skilled person, wherein the functionality resides in an unspecific place, like on an arbitrary server or even virtual machine, and/or is not tied to specific hardware. In such case, the functionality may also be distributed over different places, e.g. several servers, virtual machines or the like. In this case, it may also be denoted a virtual network function.

Advantages that may be achieved include a substantial reduction in operations administration and maintenance (OAM) and operational expenditure (OPEX) when configuring and planning the network deployment, since as soon as a range is to be added/deleted for a GroupId, it is only done in the NRF (and not in each and every NF profile instance in the network). A reduction in memory consumption and footprint in all NFs (except NRF) can be achieved by storing just Group Identifiers instead of SUPI ranges per NF profile. A further advantage is an improvement in performance/computing. The NF consumers fetch the ranges when they are needed, since for every range discovered and cache, every SUPI received must be matched against the cached ranges for each group. This makes the lookups much faster if only a subset of the ranges is cached, saving also storage in the NF consumer, since instead of storing all ranges per NF profile instance (alternative described in FIG. 2), the NF consumer stores a single copy of the ranges per Group of NF instances.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

NOTE: throughout this description, the term SUPI is used since it is the internal/private identifier (IMSI) used in the 5GC network, but other identifiers (existing or future) can be considered to use for the inventive concepts described herein. For example, NFs can also register GPSI ranges (public identities in the 5GC network), routing indicators (included in concealed identities), etc. This way, whenever SUPI is explicitly used in the descriptions of various embodiments of inventive concepts, it may refer to other identifiers associated/provisioned to users, since the inventive principles are kept unchanged when it comes to management and routing.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 1A:
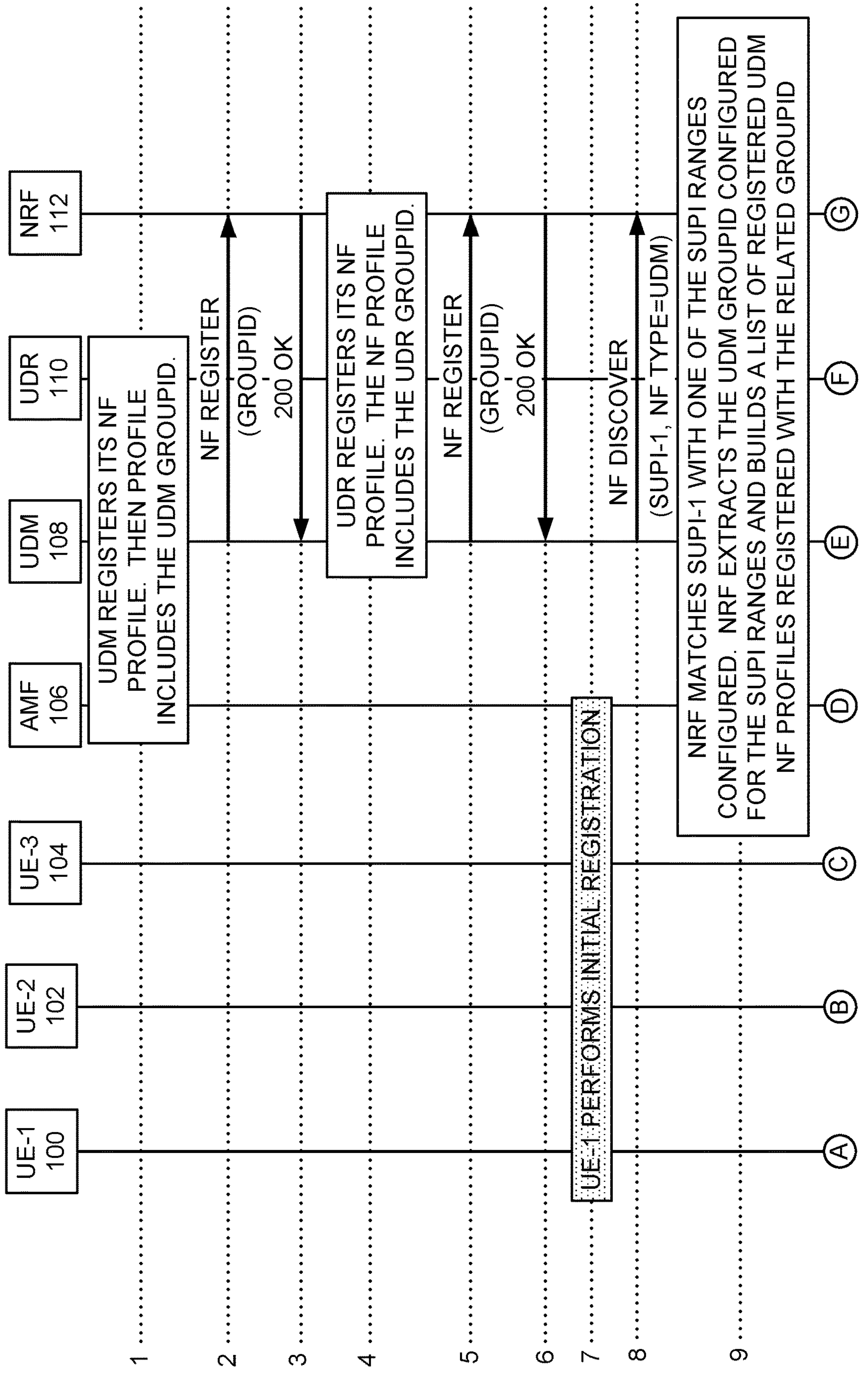
FIGS. 1A-1C are signaling diagrams illustrating a NRF mapping problem.
Figure 1B:
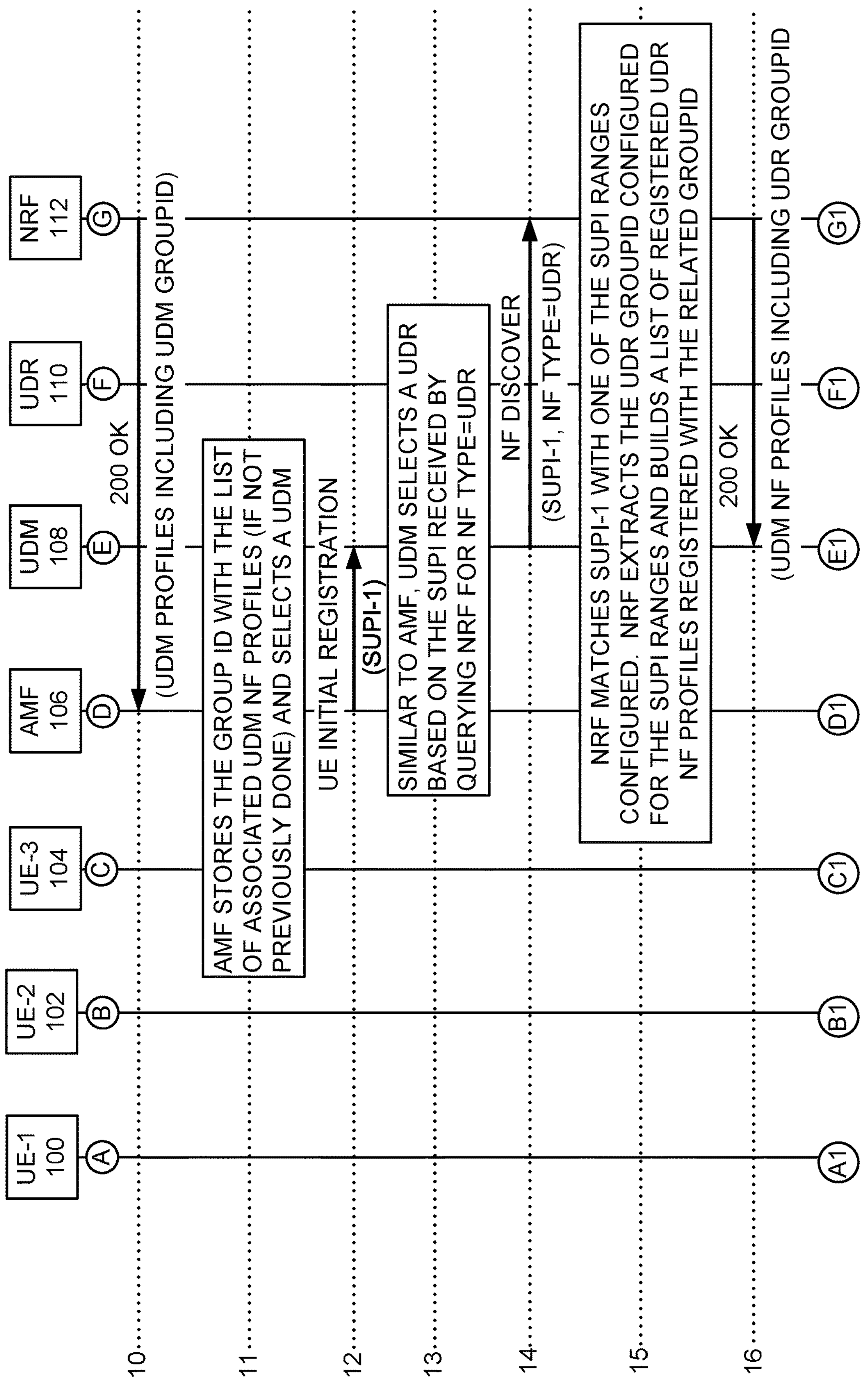
Figure 1C:
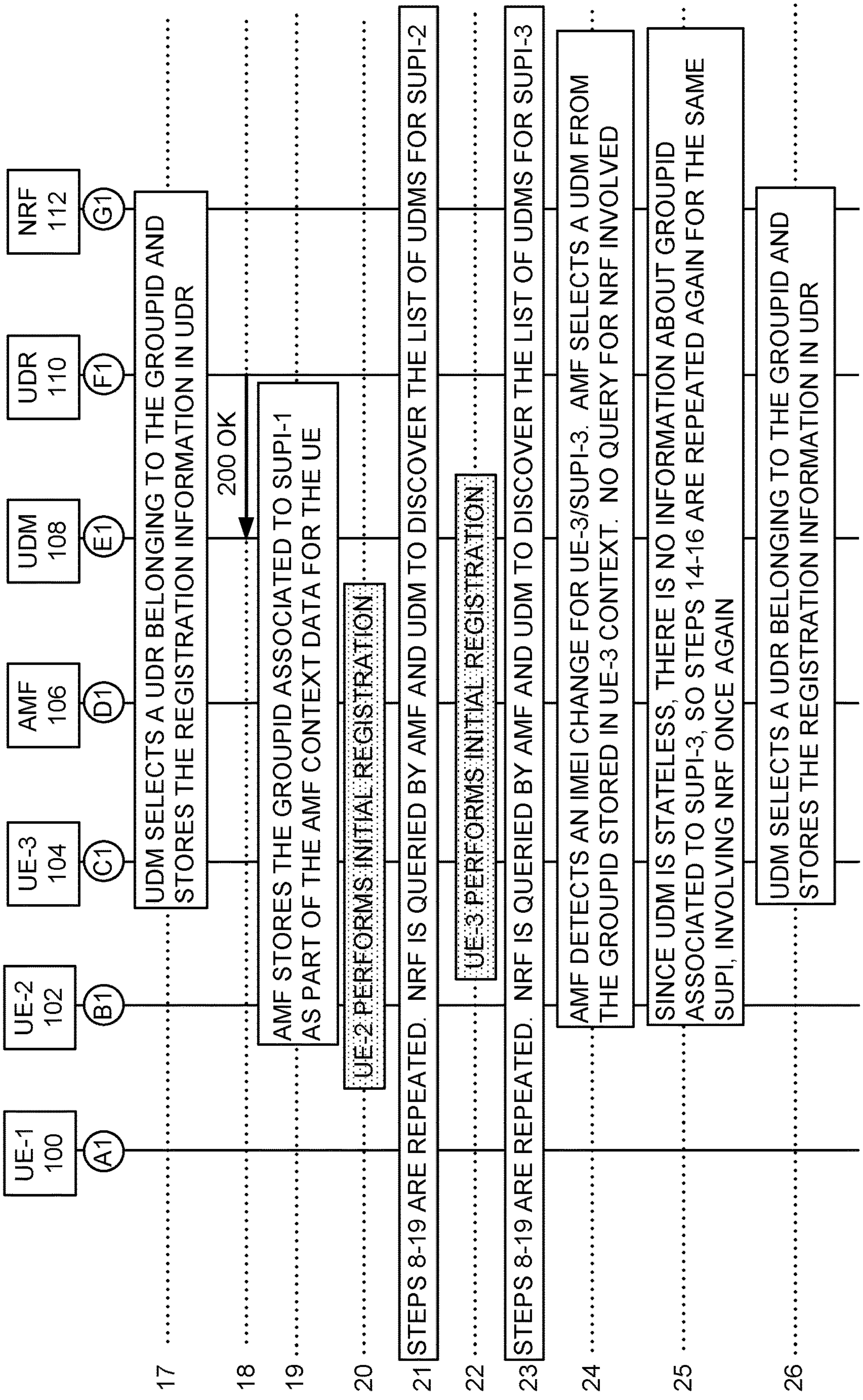
Figure 2A:
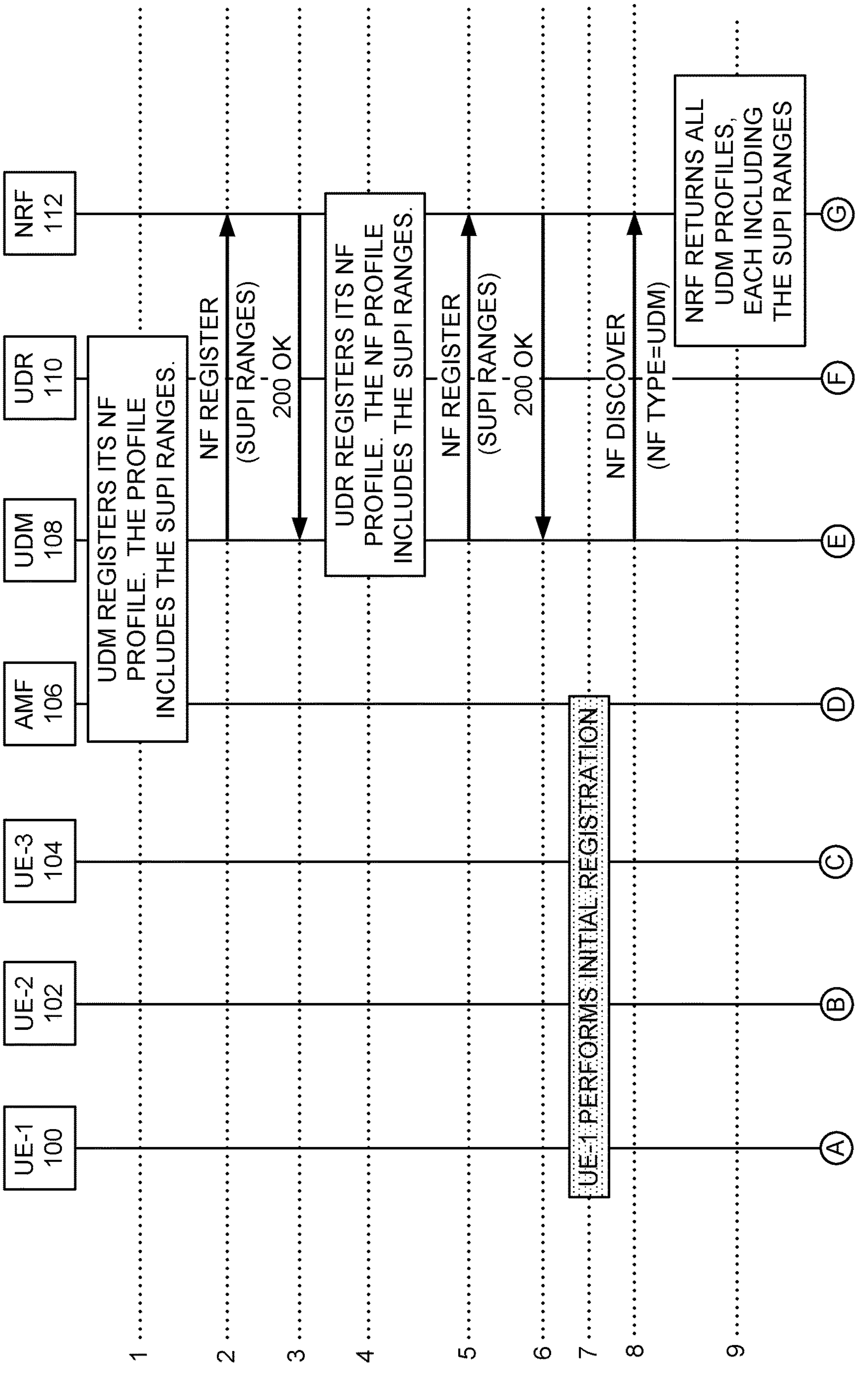
FIGS. 2A-2C are a signaling diagram illustrating a problem in SUPI ranges lookup in NF profiles.
Figure 2B:
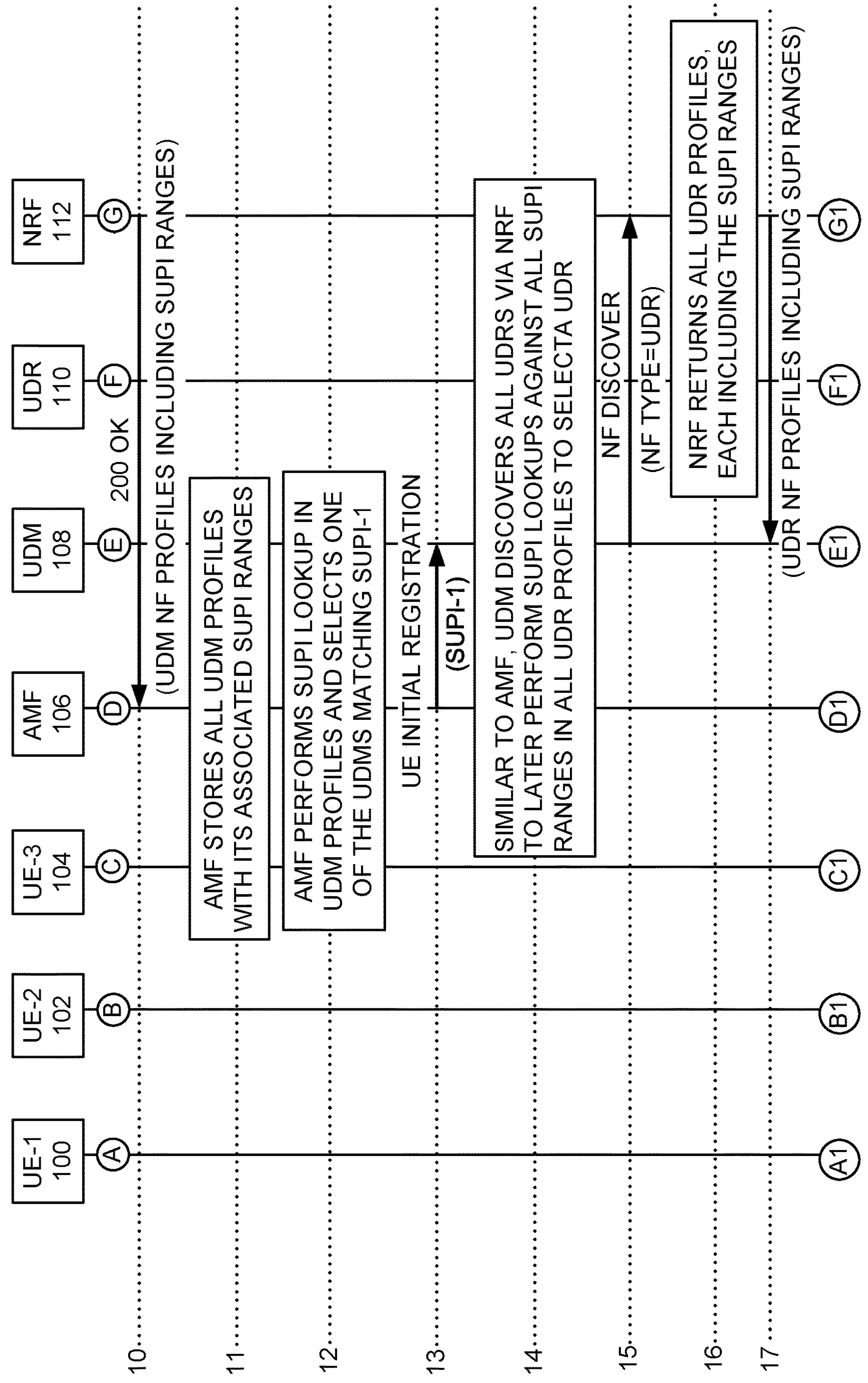
Figure 2C:
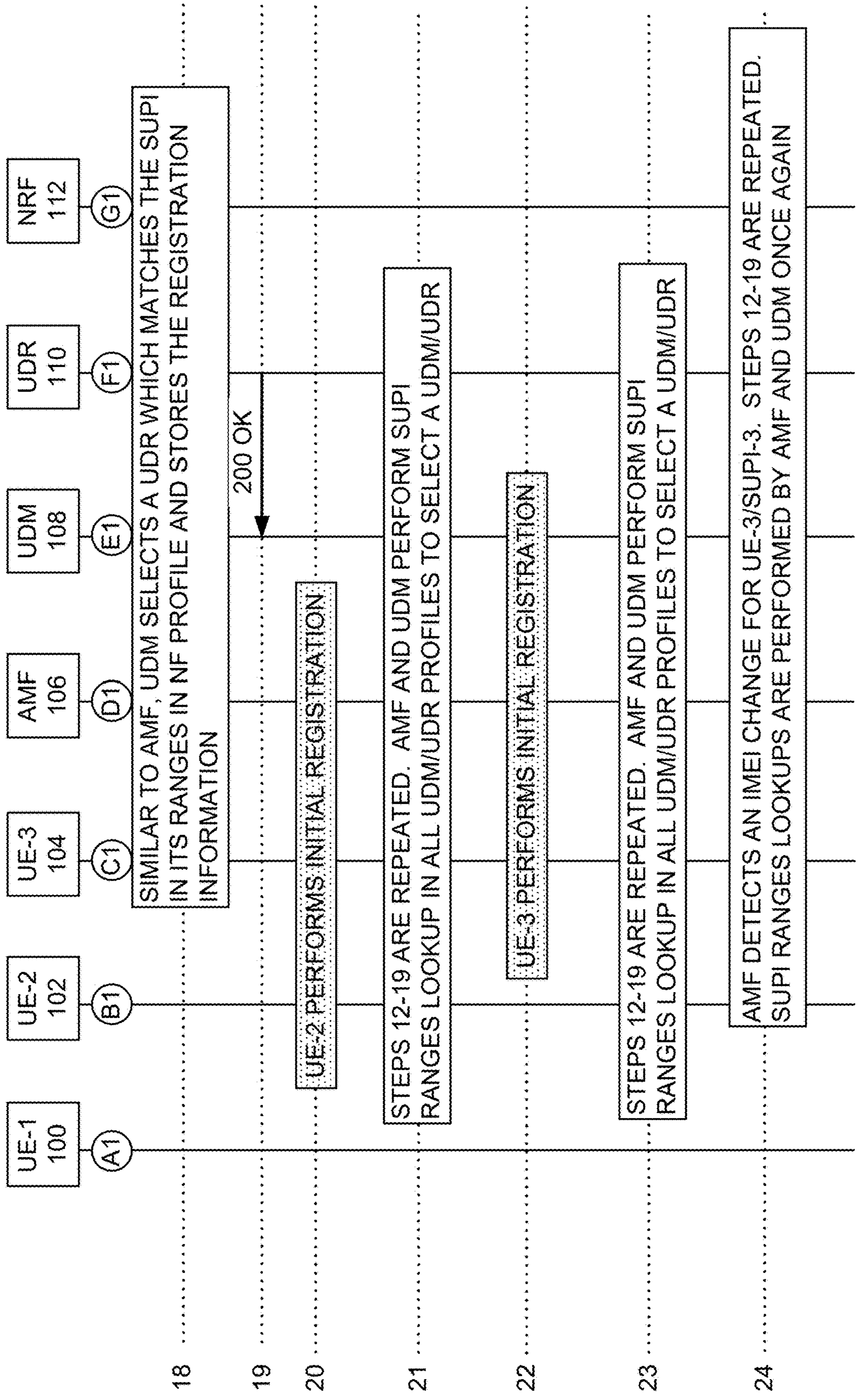
Figure 3:
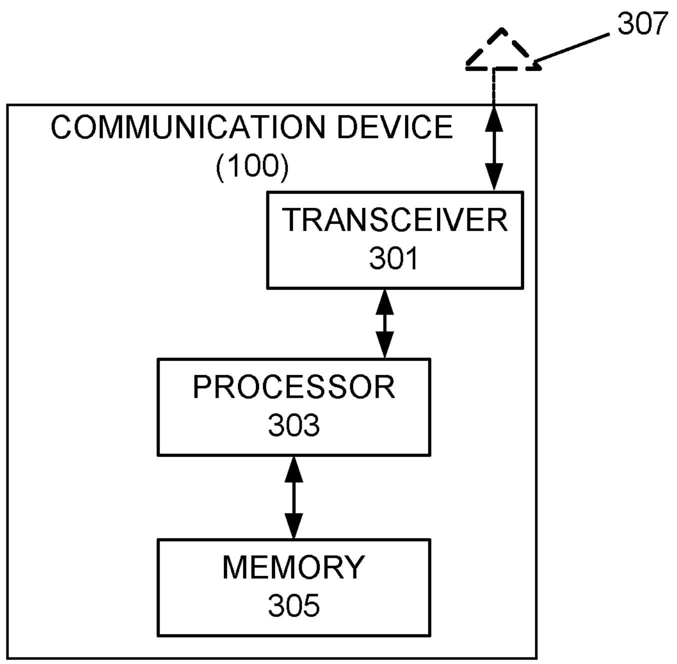
FIG. 3 is a block diagram illustrating a wireless device UE according to some embodiments of inventive concepts.

FIG. 3 is a block diagram illustrating elements of a communication device 100 (also referred to as a mobile terminal, a mobile communication terminal, a wireless device, a wireless communication device, a wireless terminal, mobile device, a wireless communication terminal, user equipment, UE, a user equipment node/terminal/device, etc.) configured to provide wireless communication according to embodiments of inventive concepts. (Communication device 100 may be provided, for example, as discussed below with respect to wireless device 4110 of FIG. 18.) As shown, communication device 100 may include an antenna 307 (e.g., corresponding to antenna 4111 of FIG. 18), and transceiver circuitry 301 (also referred to as a transceiver, e.g., corresponding to interface 4114 of FIG. 18) including a transmitter and a receiver configured to provide uplink and downlink radio communications with a base station(s) (e.g., corresponding to network node 4160 of FIG. 18, also referred to as a RAN node) of a radio access network. Communication device 100 may also include processing circuitry 303 (also referred to as a processor, e.g., corresponding to processing circuitry 4120 of FIG. 18) coupled to the transceiver circuitry, and memory circuitry 305 (also referred to as memory, e.g., corresponding to device readable medium 4130 of FIG. 18) coupled to the processing circuitry. The memory circuitry 305 may include computer readable program code that when executed by the processing circuitry 303 causes the processing circuitry to perform operations according to embodiments disclosed herein. According to other embodiments, processing circuitry 303 may be defined to include memory so that separate memory circuitry is not required. Communication device 100 may also include an interface (such as a user interface) coupled with processing circuitry 303, and/or communication device 100 may be incorporated in a vehicle.

As discussed herein, operations of communication device 100 may be performed by processing circuitry 303 and/or transceiver circuitry 301. For example, processing circuitry 303 may control transceiver circuitry 301 to transmit communications through transceiver circuitry 301 over a radio interface to a radio access network node (also referred to as a base station) and/or to receive communications through transceiver circuitry 301 from a RAN node over a radio interface. Moreover, modules may be stored in memory circuitry 305, and these modules may provide instructions so that when instructions of a module are executed by processing circuitry 303, processing circuitry 303 performs respective operations (e.g., operations discussed below with respect to Example Embodiments relating to wireless communication devices). According to some embodiments, a communication device 100 and/or an element(s)/function(s) thereof may be embodied as a virtual node/nodes and/or a virtual machine/machines.

Figure 4:
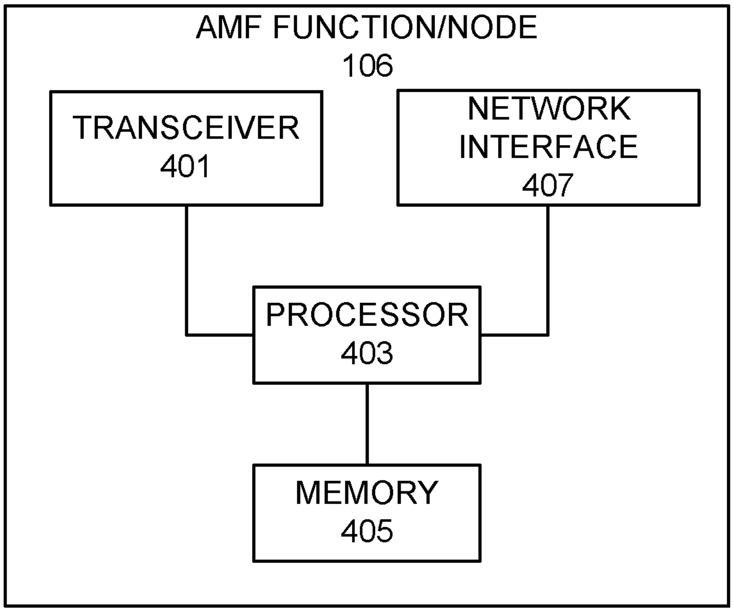
FIG. 4 is a block diagram illustrating an access management and mobility function, AMF function/node according to some embodiments of inventive concepts.

FIG. 4 is a block diagram illustrating elements of a access and mobility management function, AMF, function/node 106 (also referred to as a network node, base station, eNodeB/eNB, gNodeB/gNB, etc.) of a Radio Access Network (RAN) configured to provide cellular communication according to embodiments of inventive concepts. (AMF function/node 106 may be provided, for example, as discussed below with respect to network node 4160 of FIG. 18.) As shown, the AMF function/node 106 may include transceiver circuitry 401 (also referred to as a transceiver, e.g., corresponding to portions of interface 4190 of FIG. 18) including a transmitter and a receiver configured to provide uplink and downlink radio communications with mobile terminals. The AMF function/node 106 may include network interface circuitry 407 (also referred to as a network interface, e.g., corresponding to portions of interface 4190 of FIG. 18) configured to provide communications with other nodes (e.g., with other base stations) of the RAN and/or core network CN. The network node may also include processing circuitry 403 (also referred to as a processor, e.g., corresponding to processing circuitry 4170) coupled to the transceiver circuitry, and memory circuitry 405 (also referred to as memory, e.g., corresponding to device readable medium 4180 of FIG. 18) coupled to the processing circuitry. The memory circuitry 405 may include computer readable program code that when executed by the processing circuitry 403 causes the processing circuitry to perform operations according to embodiments disclosed herein. According to other embodiments, processing circuitry 403 may be defined to include memory so that a separate memory circuitry is not required.

As discussed herein, operations of the AMF function/node 106 may be performed by processing circuitry 403, network interface 407, and/or transceiver 401. For example, processing circuitry 403 may control transceiver 401 to transmit downlink communications through transceiver 401 over a radio interface to one or more mobile terminals UEs and/or to receive uplink communications through transceiver 401 from one or more mobile terminals UEs over a radio interface. Similarly, processing circuitry 403 may control network interface 407 to transmit communications through network interface 407 to one or more other network nodes and/or to receive communications through network interface from one or more other network nodes. Moreover, modules may be stored in memory 405, and these modules may provide instructions so that when instructions of a module are executed by processing circuitry 403, processing circuitry 403 performs respective operations (e.g., operations discussed below with respect to Example Embodiments relating to RAN nodes). According to some embodiments, AMF function/node 106 and/or an element(s)/function(s) thereof may be embodied as a virtual node/nodes and/or a virtual machine/machines.

According to some other embodiments, a AMF function/node 106 may be implemented as a core network CN node without a transceiver. In such embodiments, transmission to a communication device may be initiated by the network node so that transmission to the communication device is provided through a network node including a transceiver (e.g., through a base station or RAN node). According to embodiments where the network node is a AMF function/node 106 including a transceiver, initiating transmission may include transmitting through the transceiver.

Figure 5:
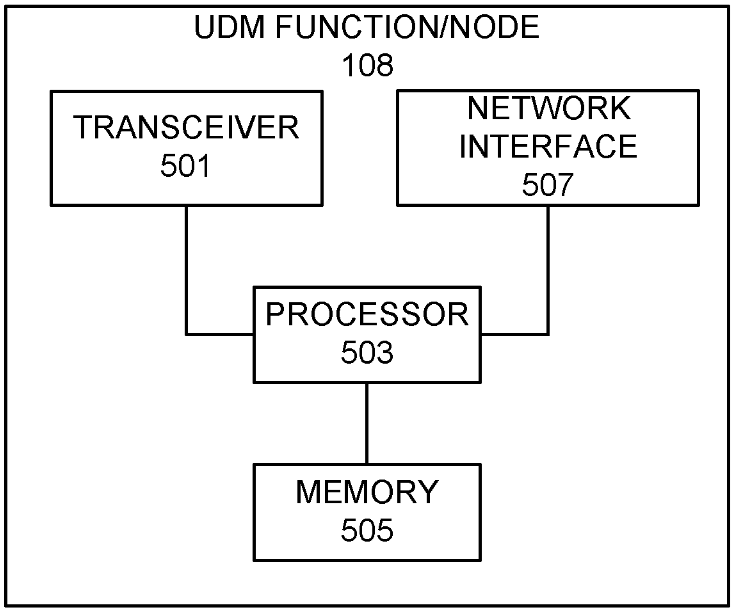
FIG. 5 is a block diagram illustrating a unified data management, UDM function/node according to some embodiments of inventive concepts.

FIG. 5 is a block diagram illustrating elements of a unified data management, UDM function/node 108 (also referred to as a network node, base station, eNodeB/eNB, gNodeB/gNB, etc.) of a Radio Access Network (RAN) configured to provide cellular communication according to embodiments of inventive concepts. As shown, the UDM function/node 108 may include transceiver circuitry 501 (also referred to as a transceiver) including a transmitter and a receiver configured to provide uplink and downlink radio communications with mobile terminals. The UDM function/node 108 may include network interface circuitry 507 (also referred to as a network interface) configured to provide communications with other nodes (e.g., with other base stations) of the RAN and/or core network CN. The UDM function/node may also include processing circuitry 503 (also referred to as a processor) coupled to the transceiver circuitry, and memory circuitry 505 (also referred to as memory, e.g., a device readable medium) coupled to the processing circuitry. The memory circuitry 505 may include computer readable program code that when executed by the processing circuitry 503 causes the processing circuitry to perform operations according to embodiments disclosed herein. According to other embodiments, processing circuitry 503 may be defined to include memory so that a separate memory circuitry is not required.

As discussed herein, operations of the UDM function/node 108 may be performed by processing circuitry 503, network interface 507, and/or transceiver 501. For example, processing circuitry 503 may control transceiver 501 to transmit downlink communications through transceiver 501 over a radio interface to one or more mobile terminals UEs and/or to receive uplink communications through transceiver 501 from one or more mobile terminals UEs over a radio interface. Similarly, processing circuitry 503 may control network interface 507 to transmit communications through network interface 507 to one or more other network nodes and/or to receive communications through network interface from one or more other network nodes. Moreover, modules may be stored in memory 505, and these modules may provide instructions so that when instructions of a module are executed by processing circuitry 503, processing circuitry 503 performs respective operations (e.g., operations discussed below with respect to Example Embodiments relating to UDM function/nodes). According to some embodiments, UDM function/node 108 and/or an element(s)/function(s) thereof may be embodied as a virtual node/nodes and/or a virtual machine/machines.

Figure 6:
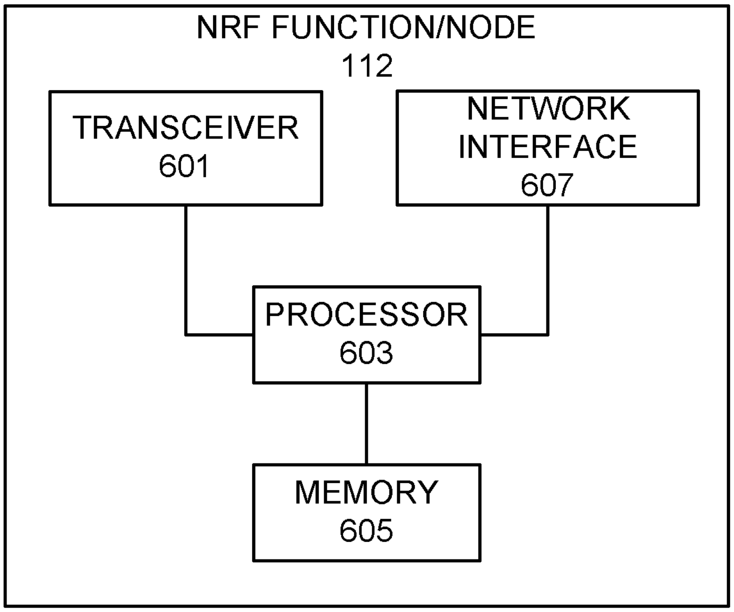
FIG. 6 is a block diagram illustrating a network function repository function, NRF, function/node according to some embodiments of inventive concepts.

FIG. 6 is a block diagram illustrating elements of a network function repository function, NRF, function/node 112 of a Radio Access Network (RAN) configured to provide cellular communication according to embodiments of inventive concepts. As shown, the NRF function/node 112 may include transceiver circuitry 601 (also referred to as a transceiver) including a transmitter and a receiver configured to provide uplink and downlink radio communications with mobile terminals. The NRF function/node 112 may include network interface circuitry 607 (also referred to as a network interface) configured to provide communications with other nodes (e.g., with other base stations) of the RAN and/or core network CN. The network node may also include processing circuitry 603 (also referred to as a processor) coupled to the transceiver circuitry, and memory circuitry 605 (also referred to as memory) coupled to the processing circuitry. The memory circuitry 605 may include computer readable program code that when executed by the processing circuitry 603 causes the processing circuitry to perform operations according to embodiments disclosed herein. According to other embodiments, processing circuitry 603 may be defined to include memory so that a separate memory circuitry is not required.

As discussed herein, operations of the NRF function/node 112 may be performed by processing circuitry 603, network interface 607, and/or transceiver 601. For example, processing circuitry 603 may control transceiver 601 to transmit downlink communications through transceiver 601 over a radio interface to one or more mobile terminals UEs and/or to receive uplink communications through transceiver 601 from one or more mobile terminals UEs over a radio interface. Similarly, processing circuitry 603 may control network interface 607 to transmit communications through network interface 607 to one or more other network nodes and/or to receive communications through network interface from one or more other network nodes. Moreover, modules may be stored in memory 605, and these modules may provide instructions so that when instructions of a module are executed by processing circuitry 603, processing circuitry 603 performs respective operations (e.g., operations discussed below with respect to Example Embodiments relating to NRF function/nodes). According to some embodiments, AMF function/node 112 and/or an element(s)/function(s) thereof may be embodied as a virtual node/nodes and/or a virtual machine/machines.

As previously indicated, the NRF is contacted each and every time by the consumer NR (e.g., UDM) to fetch the list of target instances (service producers) for each and every SUPI. Even for stateful NFs (e.g., an AMF) storing the GroupId for the SUPI, if the wireless device (e.g., UE) is de-registered, then NRF is contacted again when the wireless device registers again in the network to discover the NF instances serving the SUPI. The contacting of the NRF each and every time makes the signaling complex and non-efficient since the NRF is forced to perform SUPI ranges lookup/matching for any NF consumer discovering the NF instances per every request. This is done for each and every SUPI in the network.

Additionally, the size of the NF profiles to be registered can be dramatically large if there are a lot of SUPI ranges. For example, some operators like China Mobile are known to have around 5,000 SUPI ranges per UDM/UDR groups. For each and every request, the NF consumer (e.g. AMF, UDM) is forced to perform SUPI ranges lookup against each and every NF profile discovered, to build a list of selectable target NFs (NF service producers). This is done on a per request received basis. Overall, this requires a lot of storage in NRF, a lot of cache memory in AMF to host all NF instances including all the SUPI ranges registered by each NF. Moreover, the impacts in performance/computing when it comes to performing lookups with thousands of ranges can be dramatic. If there are, e.g. 20 NF instances, each registering 5.000 SUPI ranges in its profile, that makes 100.000 SUPI ranges to lookup before deciding the target NF instance to send the request. This is done for each and every request to be sent.

Various embodiments of inventive concepts address these problems. For example, in some embodiments, an information/attribute is added in to the NF profile to indicate that NRF hosts the SUPI ranges mapping to the GroupId configured in the NF profile. This new information is registered in NRF with the corresponding API/interface update.

In other embodiments, progressive discovery can be done in the network by adding a new application program interface (API/interface) (or, in some embodiments, by extending the existing API/interface) to be offered by NRF so that the NF consumers can discover in a progressive manner the SUPI ranges configured in NRF as soon as they are needed. This substantially decreases the signaling (to almost zero) between NF consumer and NRF when the ranges are already discovered, since the NF consumer can perform the SUPI lookups locally, without the need to contact NRF every time. The API can offer the possibility of subscribing to changes in the SUPI ranges managed by the GroupId. The corresponding subscription can indicate that both added/deleted ranges are to be notified (that is, any change in the ranges) or just the deleted ranges are to be notified (since the added ranges will be discovered progressively when needed (i.e. when a SUPI falling within the new range is received by the NF consumer)

GroupID definition and handling are performed at network level (instead of at NF level). The Group Id concept is extended to include more than one NF type, so that two different NFs (e.g. UDM and UDR) are grouped together. This solves the performance issues in purely segmented networks per SUPI ranges, since no SUPI lookup at all is perform when determining and selecting the target NF instance, e.g. UDM is selecting UDR simply based on the matching GroupId between UDM instance and UDR instances, regardless of the SUPI received.

Advantages that may be achieved using the various embodiments of inventive concepts described herein include a substantial reduction of OAM/OPEX when configuring and planning the network deployment, since as soon as a range is to be added/deleted for a GroupId, it is only done in the NRF (and not in each and every NF profile instance in the network). Such modifications are now spread in the network and all the NFs needing the information will be aware, so that the ranges are quickly known by all related NFs even though they were configured in a single NF. In short: NRF and its associated network automation is still kept in its essence. NRF is acting as a repository function for information which can be discovered, cached and used, and at the same time making sure that the cache always keeps the most up-to-date SUPI ranges.

Another advantage that may be achieved is a reduction in the size of responses from NRF, since the ranges are discovered reactively, as soon as they are needed, that is, progressively. The new API may offer the possibility to discover all ranges for the GroupId in a single request/response, but this is not recommended since the NF consumer might receive thousands of ranges, and many of them might not be needed in the short/medium/large time.

A further advantage that may be achieved is an improvement in performance/computing. The NF consumers fetch the SUPI ranges when they are needed, since for every range discovered and cache, every SUPI received must be matched against the cached ranges for each group. This results in the lookups being much faster if only a subset of the ranges is cached, saving also storage in the NF consumer, since instead of storing all ranges per NF profile instance, the NF consumer stores a single copy of the ranges per Group of NF instances.

The SUPI lookups in essential NFs like UDM, PCF, etc. in may deployments may be reduced to zero or near zero by setting the UDMs/UDRs in clusters/groups by applying the GroupId concept to a higher level than NF level.

Memory consumption and footprint may be reduces in all NFs (except NRF) by storing just Group Identifiers instead of SUPI ranges per NF profile. The inventive concepts allows this saving but at the same time gets rid of the huge cons of alternative 1 described above, since the NRF is not contacted to perform a SUPI lookup per each and every request received by each and every NF in the network using the inventive concepts described herein.

Figure 7A:
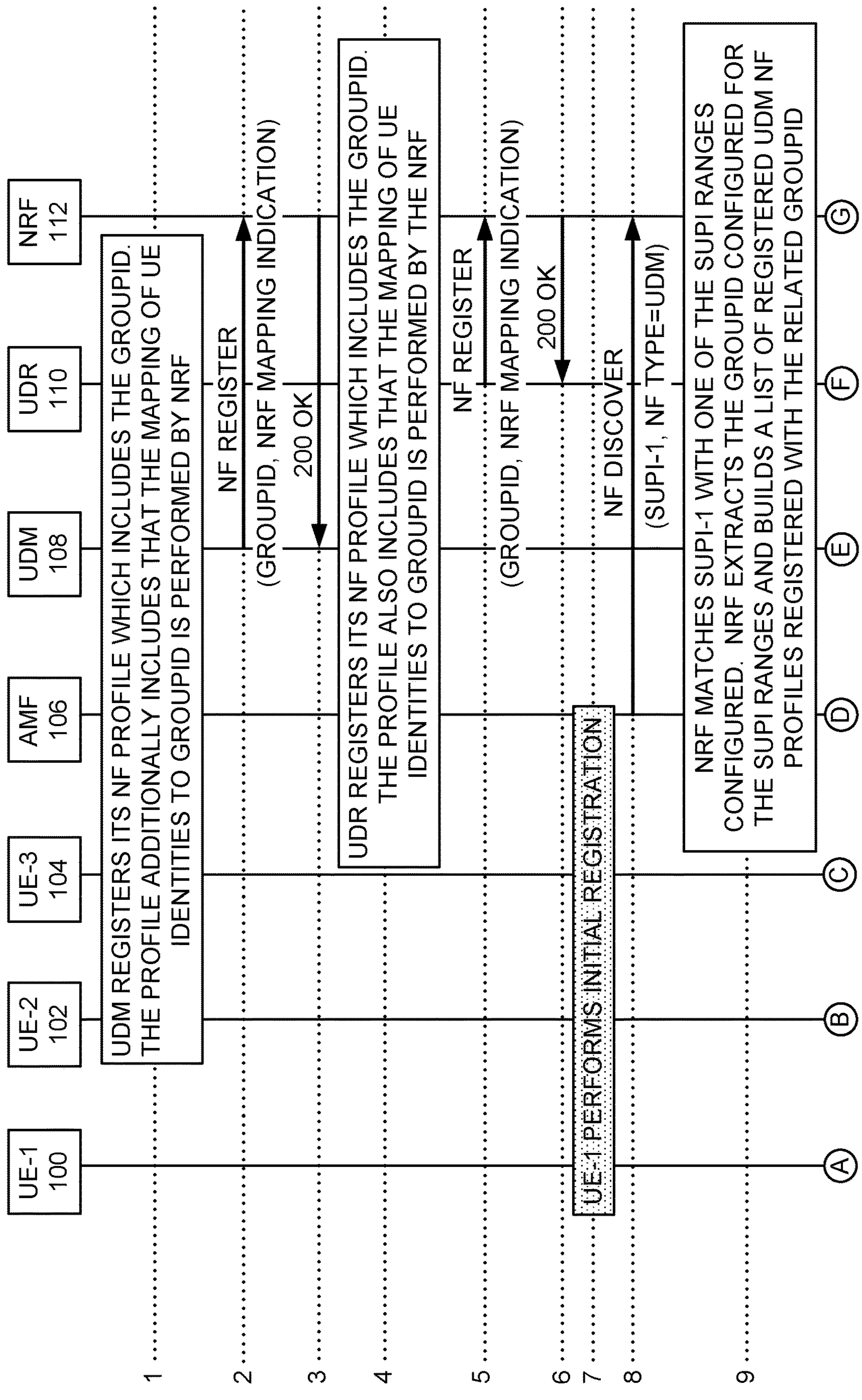
FIGS. 7A-7D is a signaling diagram illustrating operations network components according to some embodiments of inventive concepts.

FIGS. 7A-7D are a signaling diagram illustrating various embodiments of inventive concepts. Turning to FIG. 7A, in operations 1-3, the UDM 108 instance registers its NF profile into the NRF 112. The registering provides a GroupId associated with the NF profile. The NF profile includes a new attribute to be registered/published in the network, so NF consumers are aware that mapping of the GroupId <->SUPI ranges served by the NF instance is performed by the NRF 112. That is, the NF consumer will know that progressive discovery of the ranges for the group can be performed.

In operations 4-6, the UDR 110 instance registers its NF profile into the NRF 112 just as the UDM 108 instance registered.

In operation 7, communication device 100 initiates a registration towards the 5GC network. This involves the AMF 106. In operations 8-10, the AMF 106 needs to contact a UDM 108 to manage the communication device 100 registration. To discover which UDM(s) can serve the request for the related SUPI, the AMF 106 performs a query towards NRF. The query includes the target NF type (in this case, UDM) and the SUPI. The NRF 112 performs a SUPI lookup, finds the associated GroupId for the SUPI range matching the SUPI, and returns all UDMs which registered the same GroupId. Each UDM instance profile returned indicates (in addition to the GroupId) that the GroupId mapping is hosted in the NRF 112. This will allow the AMF 106 to progressively learn the network configuration to avoid continuous requests towards the NRF 112 for SUPIs under the same SUPI range/GroupId just managed.

Figure 7B:
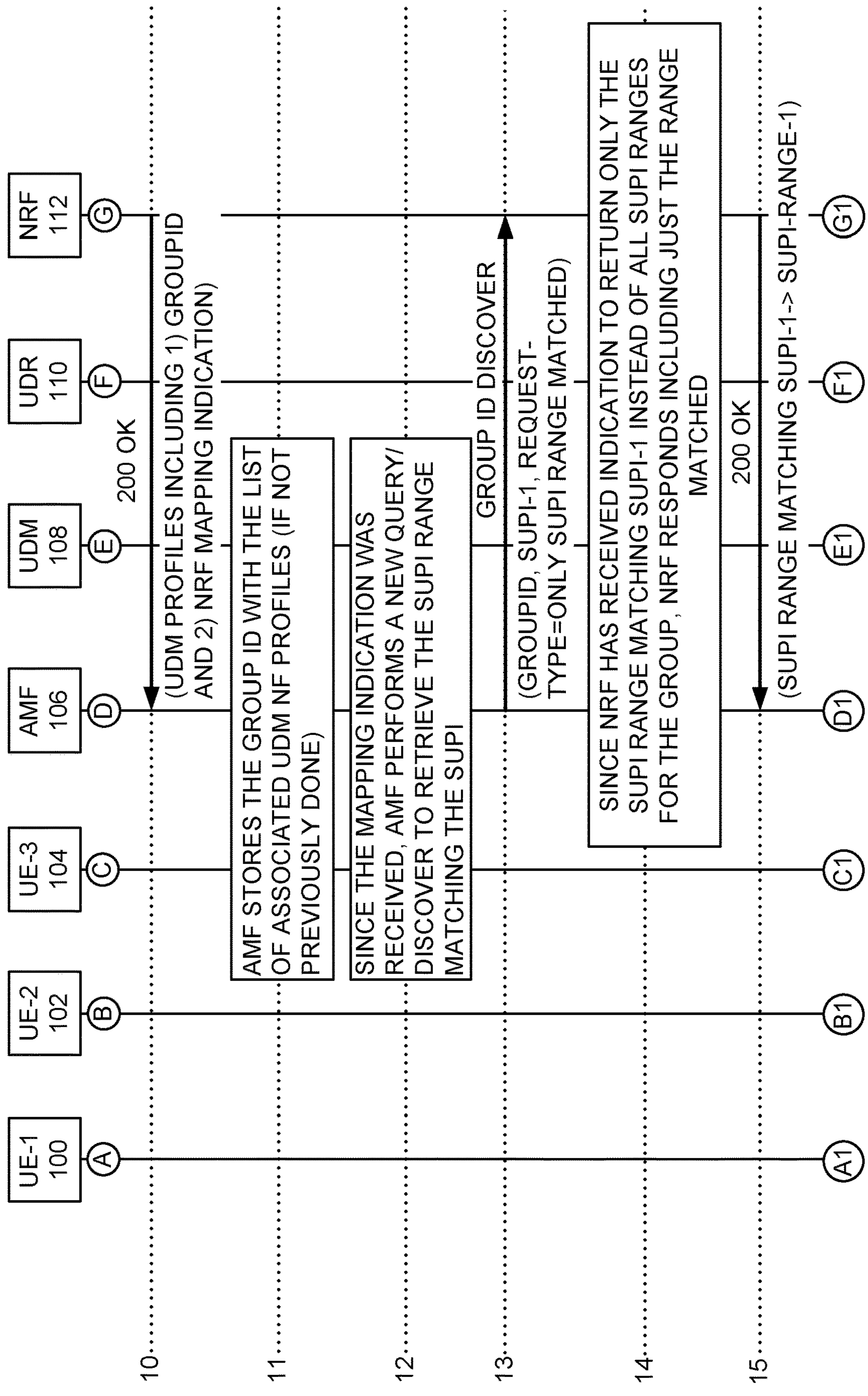

Turning to FIG. 7B, in operation 11, the AMF stores received information (if not available in its cache), that is, the association between the GroupId and the list of UDM instances belonging to the group identified by the GroupId.

In operations 12-15, since the NF profiles include the indication about the NRF 112 providing the mapping, the AMF 106 performs a new request to discover the SUPI range just matched by the NRF (instead of all SUPI ranges for the GroupId) for the SUPI/GroupId/NF type (UDM). Thus, the AMF 106 transmits a Group ID Discovery request to the NRF 112 where the Group Id Discovery request includes a GroupID, the SUPI-1 identifier, and an indication that the request is for only SUPI ranges matched. The NRF 112, since the NRF 112 has received the indication to return only the SUPI range matching the SUPI-1 identifier instead of all SUPI ranges for the group having the GroupId, the NRF 112 responds in operation 15 and includes just the SUPI range matched to the SUPI-1.

Figure 7C:
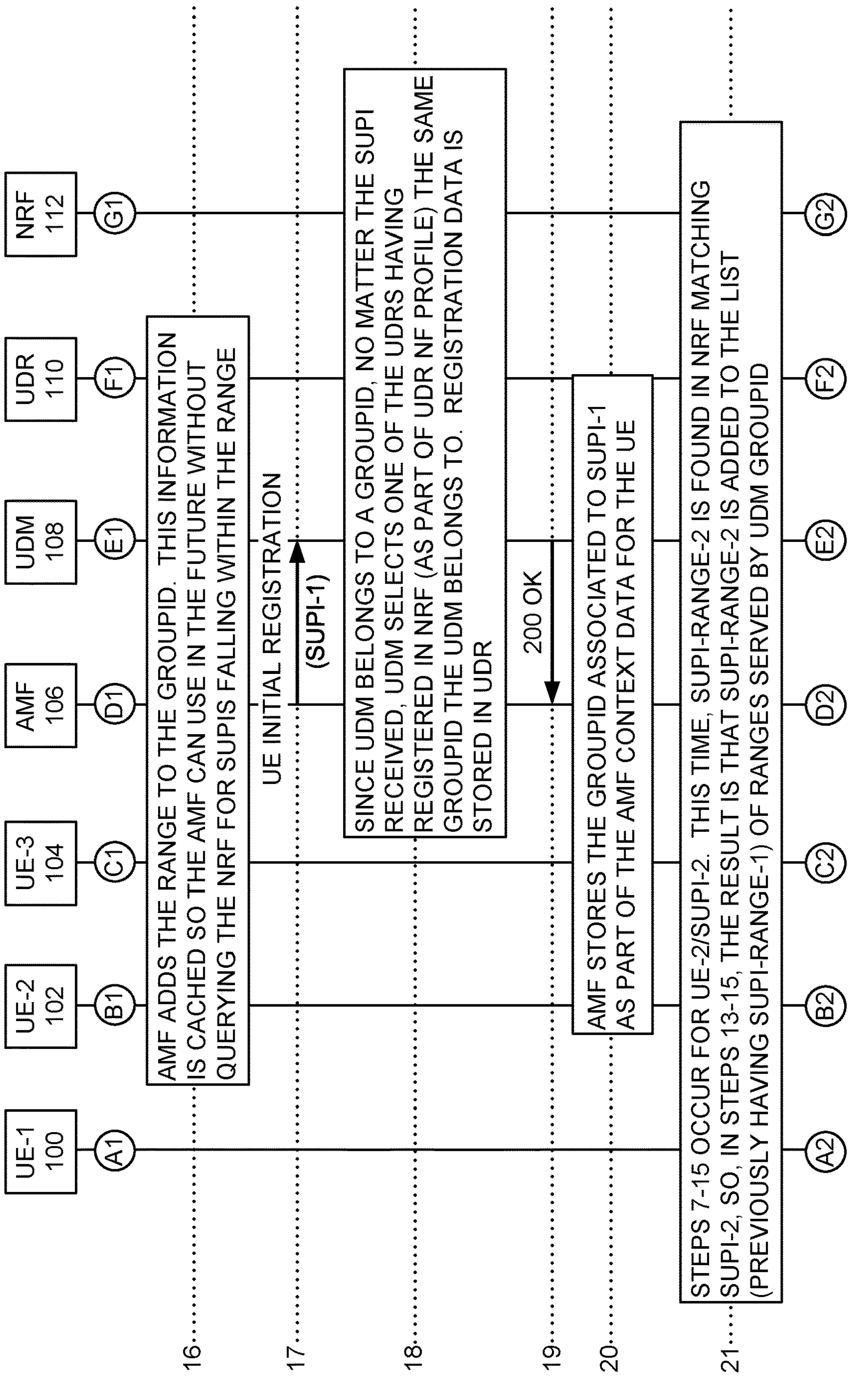

Turning to FIG. 7C, in operation 16 the SUPI range returned by the NRF 112 is stored by the AMF 106 locally in an AMF cache, that is, the range is added to the GroupId information (which already contains the list of UDM instances). The AMF 106 thus has learned that, for every SUPI within such range, it can select any UDM within the related group, without the need to contact the NRF 112 at all. This will be done progressively whenever is required, i.e. whenever a new SUPI lands at the AMF 106, if not within the range of any UDM group stored, steps 8-16 are performed, since it is expected that more SUPIs within the same range will land at the AMF in a near future.

NOTE 1: it must be noted that, although an extra query is required to NRF 112 to discover the SUPI range just matched, this is done just once. As an example, if a range contains 100K SUPIs, it is just one query out of 100K. Before inventive concepts provided herein, the NRF 112 was contacted 100K times to return the same GroupId for the 100K SUPIs.

NOTE 2: As an optimization, the NRF 112 can return the SUPI range matched in step 10, so that the AMF 106 learns from the response both the GroupId and the SUPI range in one shot. However, although it saves the query in step 13, this breaks the Service Based interface (SBI) principles in 5GC, since this information is not part of an NF profile instance, but part of a Group of NFs. Note that changes in the ranges of the Group (see FIG. 7) need to be notified separately from changes in the NF profile of an NF instance.

In operation 17, the AMF 106 transmits a UE initial registration request to the UDM 108. In operation 18, when the UDM 108 receives the registration request from the AMF 106, the UDM 108 selects a UDR 110 with the same exact GroupId as the UDM 108. Zero SUPI lookups are performed and the NRF 112 is not contacted at all. Thus, since the UDM 108 belongs to a GroupId, no matter the SUPI received, the UDM 108 selects one of the UDRs 110 having registered in the NRF 112 (as part of the UDR NF profile) with the same GroupID the UDM 108 belongs to. The registration data is stored in the UDR 110. In operation 19, the AMF 106 receives information on the UDR 110 selected by the UDM 108.

NOTE 3: It is assumed that UDM 108 performed an initial discovery of UDRs (e.g. at startup/instantiation) and, when detecting that there are UDRs profiles returned by the NRF 112 with the same GroupId of the UDM 108, only those UDRs are stored/cached, and the rest are discarded.

NOTE 4: It must be noted that the inventive concepts extends the concept of the GroupId per NF type, e.g. currently, as defined in 3GPP, the GroupId is NF level concept, e.g.

UDR-instance-1 GroupId="udr-north-region"
UDR-instance-2 GroupId="udr-north-region"
UDR-instance-3 GroupId="udr-east-region"
UDR-instance-4 GroupId="udr-east-region"
UDM-instance-1 GroupId="udm-east-region"
UDM-instance-2 GroupId="udm-east-region"
UDM-instance-3 GroupId="udm-north-region"
UDM-instance-4 GroupId="udm-north-region"

The inventive concepts enables the GroupId to be shared across different NF types (i.e. to be global), e.g.

UDR-instance-1 GroupId="north-region"
UDR-instance-2 GroupId="north-region"
UDR-instance-3 GroupId="east-region"
UDR-instance-4 GroupId="east-region"
UDM-instance-1 GroupId="east-region"
UDM-instance-2 GroupId="east-region"
UDM-instance-3 GroupId="north-region"
UDM-instance-4 GroupId="north-region"

This extended concept/behavior results in an optimal performance and grouping, since the UDM/UDR are grouped together, so that UDM always selects UDRs from the same group (e.g. UDMs in the north region only select UDRs in the north region, with no SUPI lookup involved at all).

In operation 20, the AMF 106 stores the GroupID as associated to the SUPI-1 as part of the AMF context data for the communication device 100.

In operation 21, the process of operations 7-15 are repeated whenever a SUPI not falling within the range of cached ranges in the AMF 106 for the cached Group information is received. After operation 21, the AMF 106 should have information per UDM group similar to:

GroupId=east-region
UDM-instance-1
UDM-instance-2
SUPI-range-1-> from 111111110 to 111111114, SUPI-range-2-> from 211111115 to 211111119
GroupId=north-region
UDM-instance-3
UDM-instance-4
SUPI-range-1-> from 111111115 to 111111119, SUPI-range-2-> from 211111110 to 211111114).

The AMF 106 should also have information per UE context/SUPI similar to:

SUPI-1->GroupId "north region"
SUPI-2->GroupId "east region

Figure 7D:
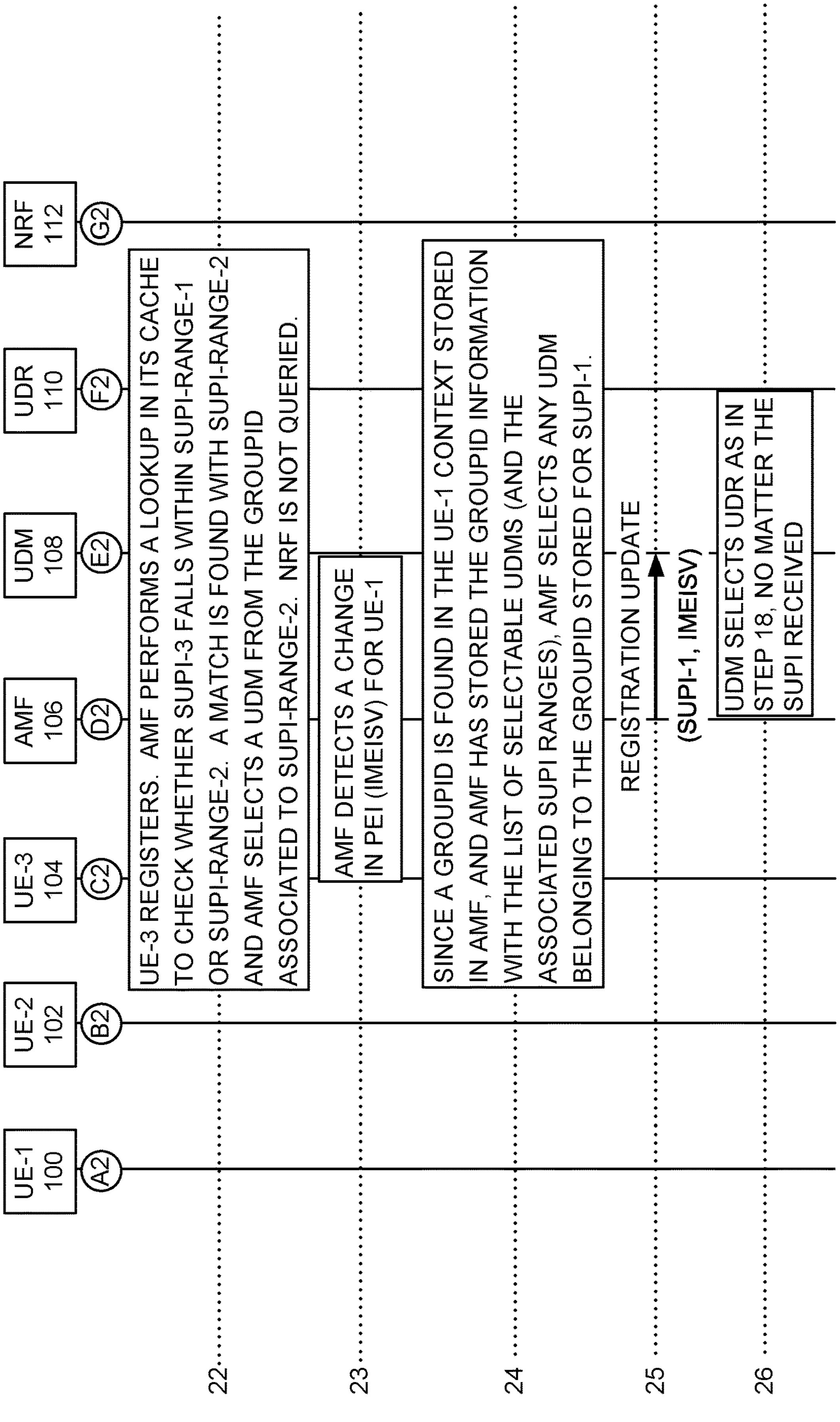
Figure 8:
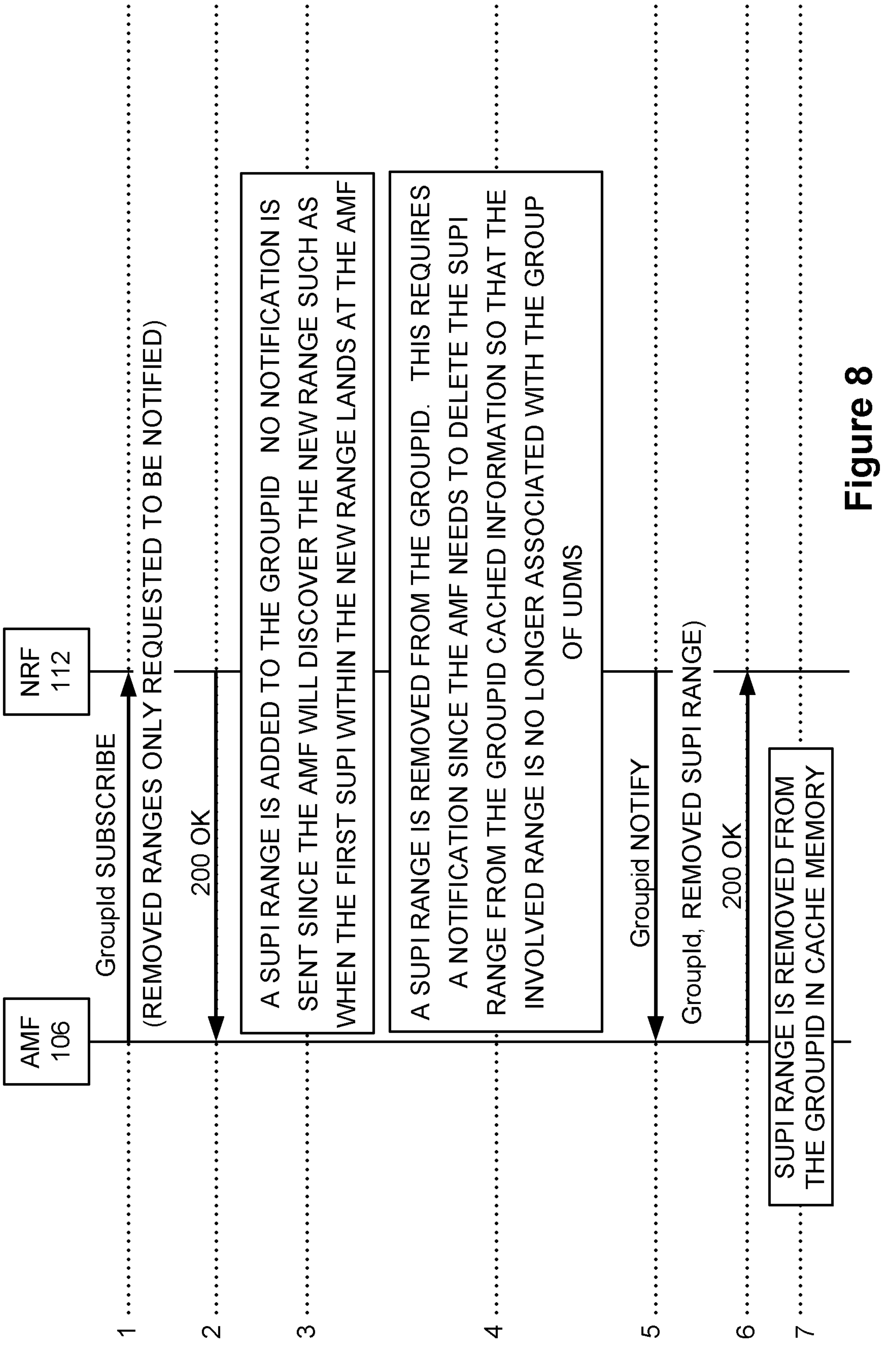
FIG. 8 is a signaling diagram illustrating operations of an AMF and NRF according to some embodiments of inventive concepts.

Turning to FIG. 7D, in operation 22, the AMF 106 receives a registration from communication device 103 having SUPI-3 identification. The AMF 106 performs a lookup in its cache to check whether or no SUPI-3 falls within SUPI-range-1 or SUPI-range-2. Assume that a match is found with SUPI-range-2. The AMF 106 will select a UDM 108 from the Group-Id associated to SUPI-range-2. The NRF 112 is not contacted at all.

In operation 23, the AMF 106 detects a change in the permanent equipment identifier (PEI) (e.g. a change in IMEISV (international mobile equipment identity software version).

In operation 24, since a GroupId is found in the communication device 101 context stored in the AMF 106, and the AMF has stored the GroupId information with the list of selectable UDMs (and the associated SUPI ranges), the AMF 106 selects any UDM belonging to the GroupID stored for SUPI-1. In operation 25, the AMF 106 sends a registration other ion update to the UDM 108 where the registration update includes the SUPI-1 and the IMEISV. In other words, for a subsequent request of a registered SUPI, the AMF 160 acts as normal, that is, it fetches the stored GroupId for the SUPI.

In operation 26, the UDM 108 selects a UDR as in operation 18 no matter the SUPI received. Thus, the UDM again performs zero SUPI lookups and zero NRF queries due to the shared/global GroupId concept.

Turning to FIG. 7, a signaling diagram illustrating operations of an AMF and NRF according to some embodiments of inventive concepts where the AMF 106 subscribes to notifications about GroupId changes in the NRF 11. This allows the NF consumer to subscribe to changes in the GroupId ranges in NRF, but with a particular/new option to request notifications only when ranges are removed from a GroupId. If ranges are added, there is no need to notify the NF service consumer since the new range will be learned when the time comes, i.e. when the first SUPI within the new range lands at the NF service consumer.

In operations 1-2, the AMF 106 transmits a GroupId subscribe request to the NRF 112 and receives an acknowledgement. The GroupId subscribe request indicates that the AMF 106 only want to be notified only when ranges are removed.

In operation 3, a SUPI is added to the GroupId. No notification is sent since the AMF 106 will discover the added range such as when the first SUPI with the added range arrives at the AMF 106.

In operation 4, a SUPI range is removed from a GroupID. This requires a notification since the AMF 106 needs to delete the SUPI range from the GroupId cached information so that the removed SUPI range is no longer associated with the group of UDMs.

In operations 5-6, the AMF 106 receives from the NRF 112 and acknowledges a GroupId Notify message that provides a GroupId and the removed SUPI range.

In operation 7, the AMF 106 removes the SUPI range from the GroupId in cached memory.

Operations of the network function repository function, NRF, function/node (112) (implemented using the structure of the block diagram of FIG. 6) will now be discussed with reference to the flow chart of FIG. 9 according to some embodiments of inventive concepts. For example, modules may be stored in memory 605 of FIG. 6, and these modules may provide instructions so that when the instructions of a module are executed by respective NRF function/node processing circuitry 603, processing circuitry 603 performs respective operations of the flow chart.

Figure 9:
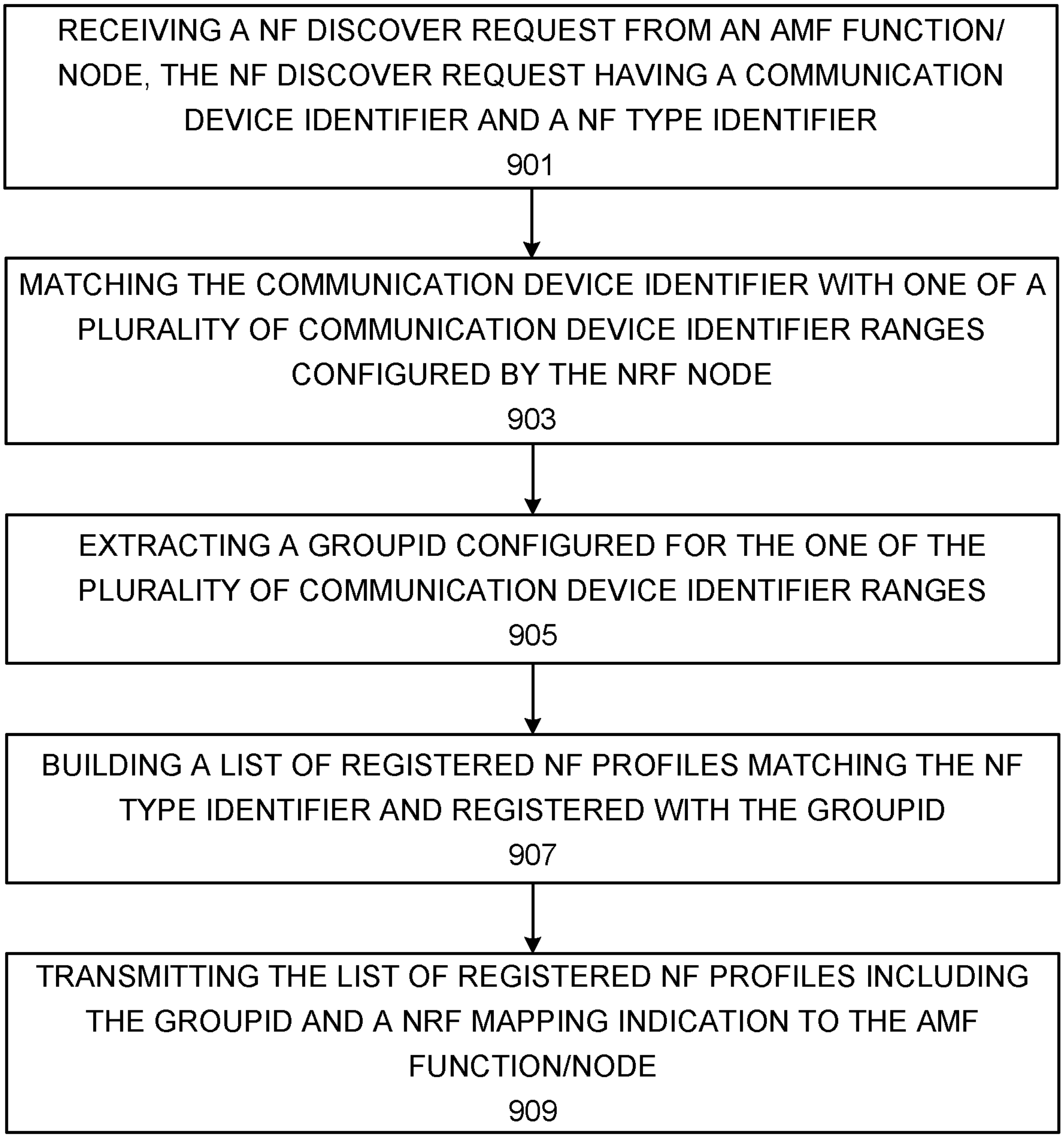
FIGS. 9-12 are flow charts illustrating operations of a NRF function/node according to some embodiments of inventive concepts.

Turning to FIG. 9, in block 901, the processing circuitry 603 receives a network function, NF, discovery request from an access and mobility management function, AMF, function/node 106, the NF discovery request having a communication device identifier and a NF type identifier. The NF type identifier identifies the type of network function. An example of NF types are UDM network functions, UDR network functions, AMF network functions, etc.

The communication device identifier in various embodiments is a subscription permanent identifier (SUPI). Other device identifiers may be used as discussed above.

In block 903, the processing circuitry 603 matches the communication device identifier with one of a plurality of communication device identifier ranges configured by the NRF function/node 112. In block 905, the processing circuitry 603 extracts a group identifier (e.g., groupId) configured for the one of the plurality of communication device identifier ranges.

In block 907, the processing circuitry 603 builds a list of registered NF profiles matching the NF type identifier and registered with the groupId.

Figure 10:
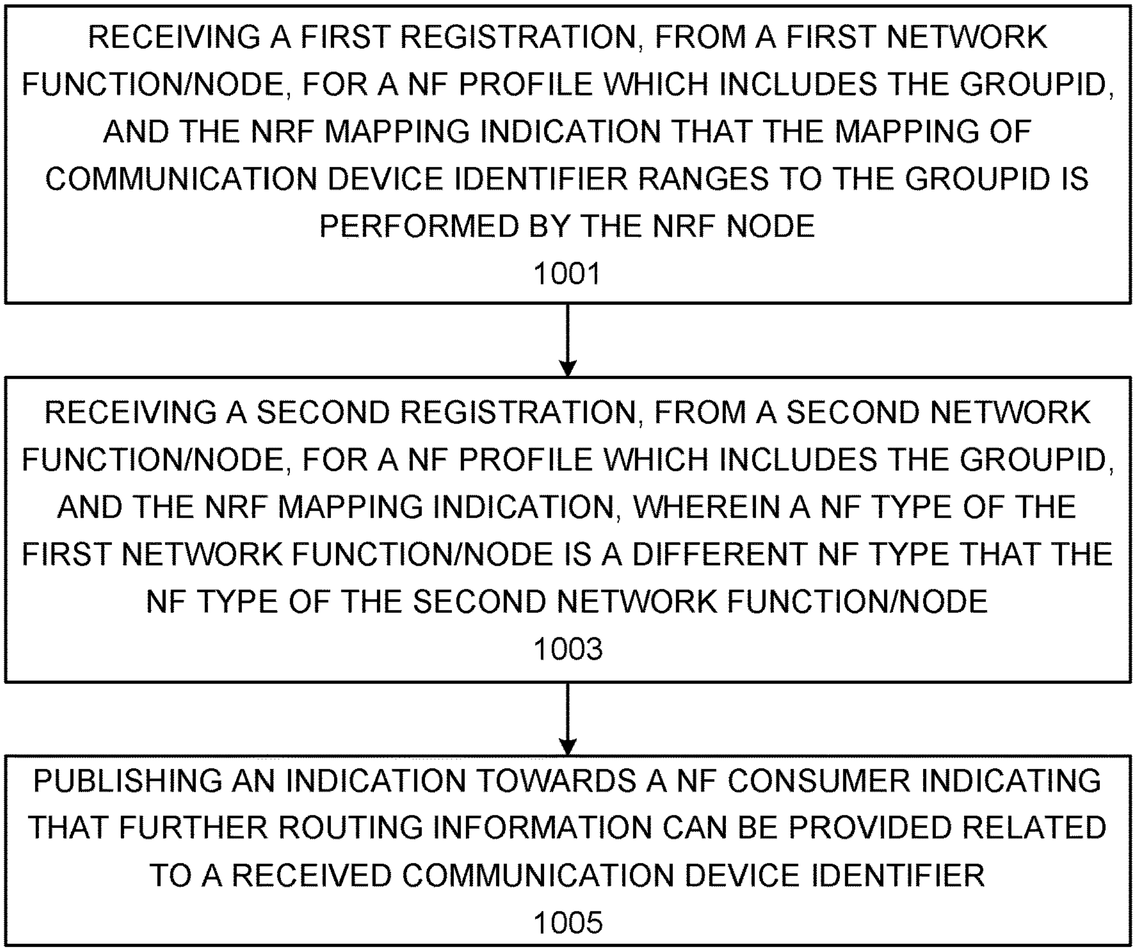

The NF profiles are registered by network functions. For example, network functions such as UDM function/nodes 108, UDR function/nodes 110, etc. FIG. 10 illustrates an embodiment of registering.

Turning to FIG. 10, in block 1001, the processing circuitry 603 receives a first registration, from a first network function/node (such as UDM function/node 108 or UDR function/node 110), for a network function, NF, profile which includes the groupId, and the NRF mapping indication that the mapping of communication device identifier ranges to the groupId is performed by the NRF function/node 116.

In block 1003, the processing circuitry 603 receives a second registration, from a second network function/node (such as UDM function/node 108 or UDR function/node 110), for a NF profile which includes the groupId, and the NRF mapping, wherein a NF type of the first network function/node is a different NF type than the NF type of the second network function/node. For example the UDM function is a different NF type than the UDR function.

In block 1005, the processing circuitry 603 publishes an indication towards a NF consumer indicating that further routing information can be provided related to a received communication device identifier.

Returning to FIG. 9, in block 909, the processing circuitry 603 transmits the list of registered NF profiles including the groupId and a NRF mapping indication to the AMF function/node 106.

Figure 11:
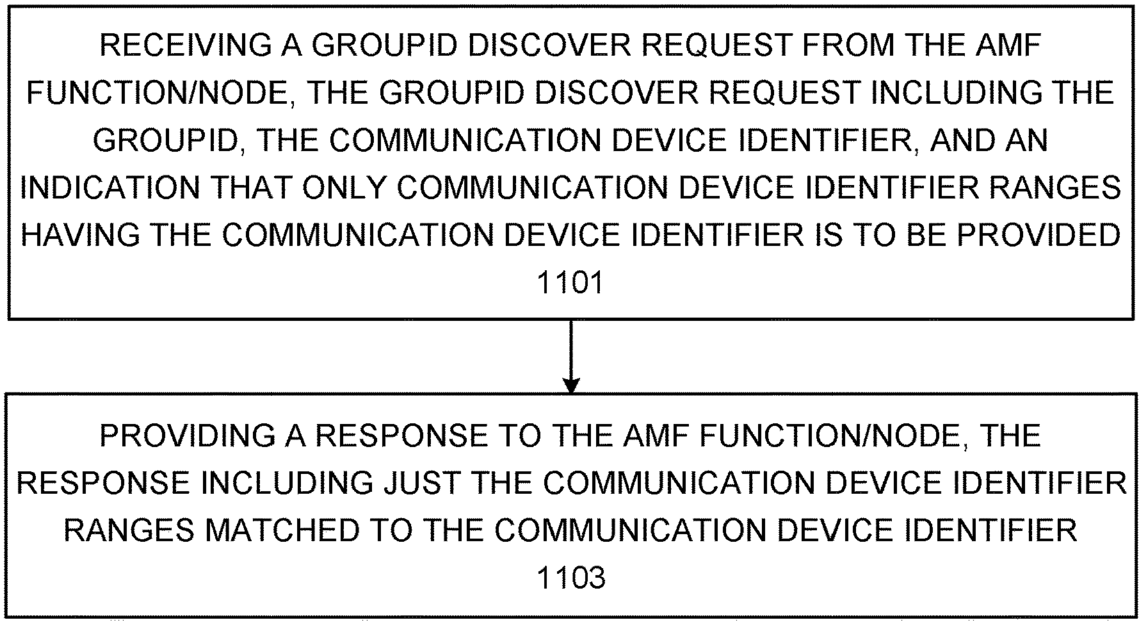

The NRF function/node 112 also receives group ID discovery request from network function/nodes. Turning to FIG. 11, in block 1101, the processing circuitry 603 receives a groupId discovery request from the AMF function/node (106), the groupId discovery request including the groupId, the communication device identifier, and an indication that only communication device identifier ranges having the communication device identifier is to be provided.

In block 1103, the processing circuitry 603 provides a response to the AMF function/node 106, the response including just the communication device identifier ranges matched to the communication device identifier.

Figure 12:
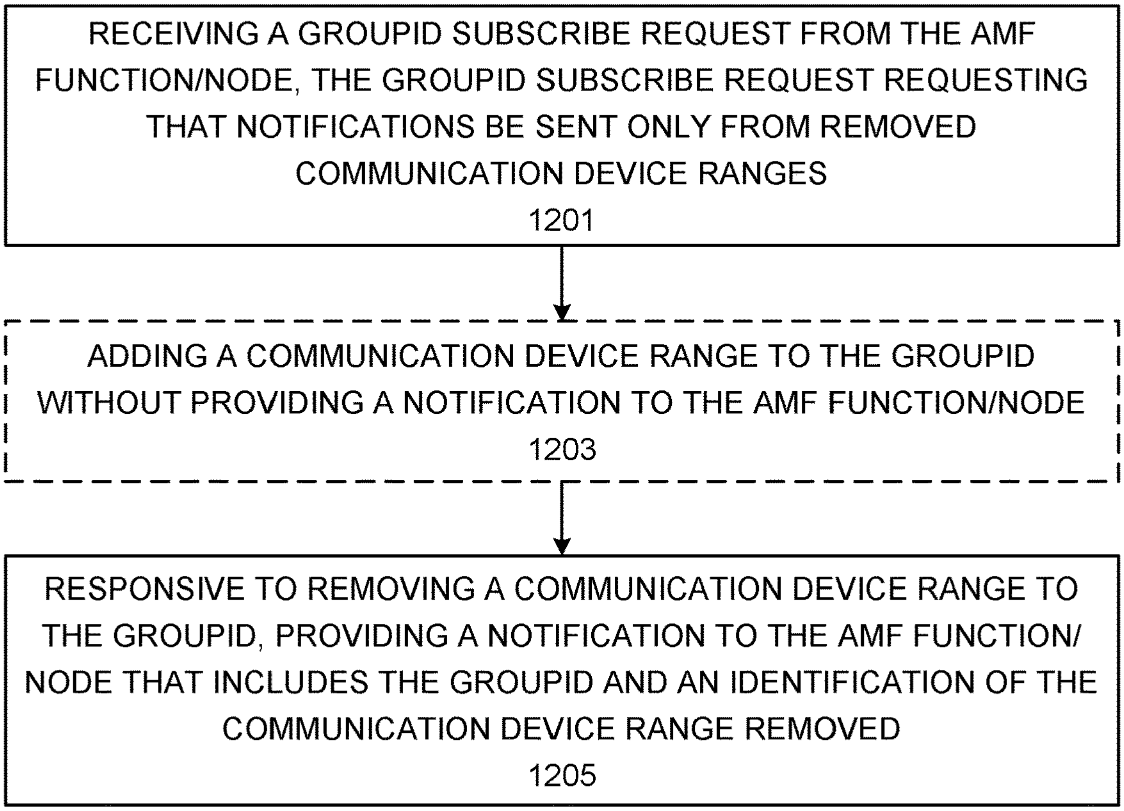

The AMF function/node may want to be notified of changes to the group ID so that its memory cache stays up to date as described above. Turning to FIG. 12, one way to be notified of changes is to subscribe to notifications.

In block 1201, the processing circuitry 603 receives a groupId subscribe request from the AMF function/node 106, the groupId subscribe request requesting that notifications be sent only from removed communication device ranges. This indicates that the AMF function/node 106 is not interested in additions as there may be no need to notify the NF service consumer since the new range will be learned when the time comes, i.e. when the first SUPI within the new range arrives at the NF service consumer. Thus, in block 1203, the processing circuitry 603 may add a communication device range to the groupId without providing a notification to the AMF function/node 106. In other embodiments, the AMF function/nodes 106 may want to also subscribe to notifications when a communication device range is added. In these embodiments, the processing circuitry 603 provides a notification to the AMF function/node when a communication device range is added to the groupId.

In block 1205, responsive to removing a communication device range to the groupId, the processing circuitry 603 provides a notification to the AMF function/node 106 that includes the groupId, and an identification of the communication device range(s) removed.

Operations of an AMF function/node 106 (implemented using the structure of FIG. 4) will now be discussed with reference to the flow chart of FIG. 13 according to some embodiments of inventive concepts. For example, modules may be stored in memory 405 of FIG. 4, and these modules may provide instructions so that when the instructions of a module are executed by respective AMF function/node processing circuitry 403, processing circuitry 403 performs respective operations of the flow chart.

Figure 13:
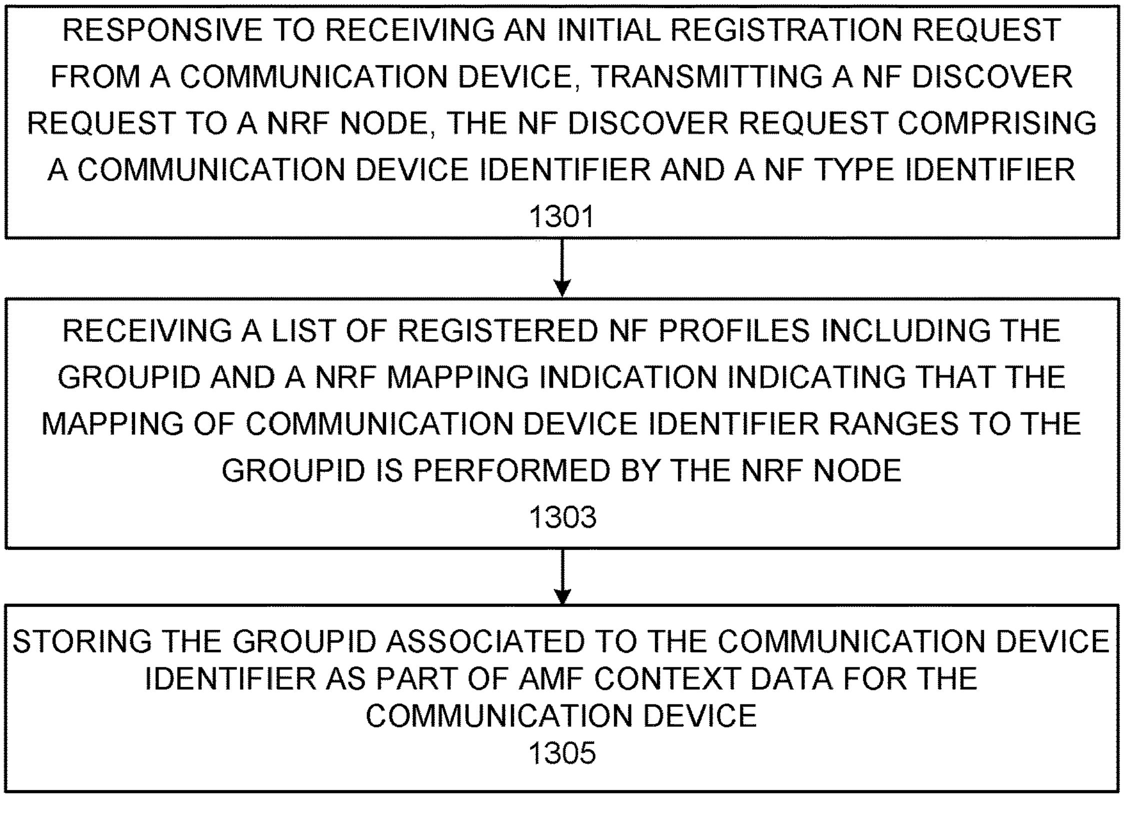
FIGS. 13-15 are flow charts illustrating operations of an AMF function/node according to some embodiments of inventive concepts.

Turning to FIG. 13, responsive to receiving an initial registration request from a communication device 100, the processing circuitry 403, in block 1301, transmits a network function, NF, discovery request to a network function repository function, NRF, node 112, the NF discovery request comprising a communication device identifier and a NF type identifier.

In block 1303, the processing circuitry 403 receives a list of registered NF profiles including the groupId and a NRF mapping indication indicating that the mapping of communication device identifier ranges to the groupId is performed by the NRF node.

In block 1305, the processing circuitry 403 stores the groupId associated to the communication device identifier as part of AMF context data for the communication device.

Various operations from the flow chart of FIG. 13 may be optional with respect to some embodiments of RAN nodes and related methods. Regarding methods of example embodiment 10 (set forth below), for example, operations of blocks 1305 of FIG. 13 may be optional.

Figure 14:
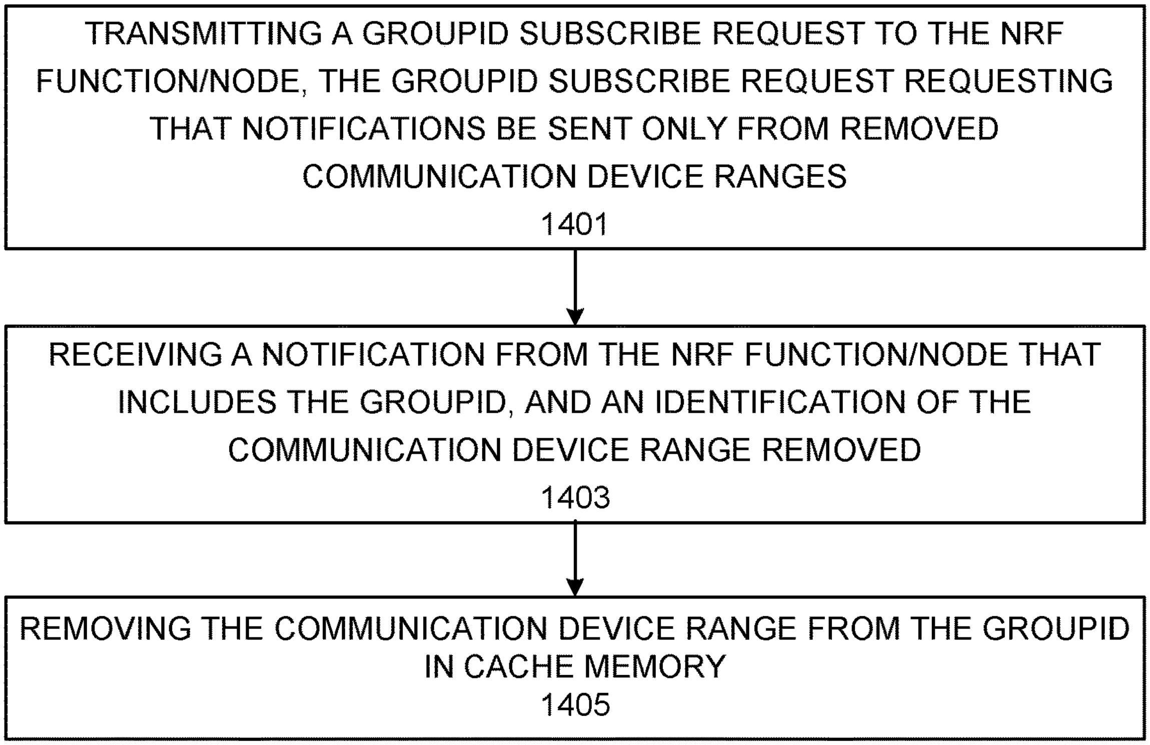

As previously indicated, the AMF function/node 106 may want to know when a change to a groupId is made. Turning to FIG. 14, an embodiment of subscribing to notifications is illustrated. In block 1401, the processing circuitry 403 transmits a groupId subscribe request to the NRF function/node (112), the groupId subscribe request requesting that notifications be sent only from removed communication device ranges. In other embodiments, the processing circuitry 403 may also request notifications be sent when communication device ranges are added.

In block 1403, the processing circuitry 403 receives a notification from the NRF function/node 112 that includes the groupId, and an identification of the communication device range(s) removed. In block 1405, the processing circuitry 403 removes the communication device range (associated with the identification) from the groupId in cache memory.

Figure 15:
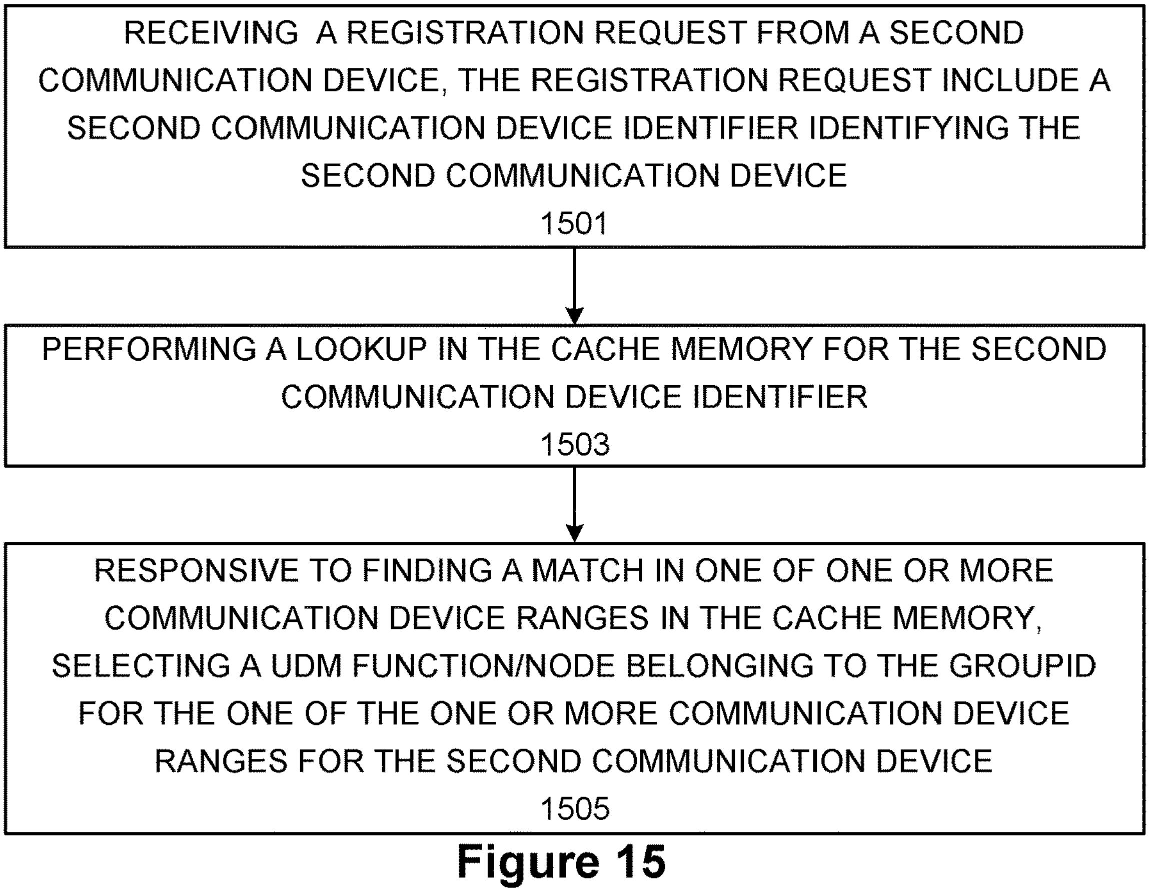

Once the AMF function/node 106 receives the list of registered NF profiles, the AMF function/node 106 may not have to contact the NRF function/node 112 for subsequent registration of communication devices. Turning to FIG. 15, in block 1501, the processing circuitry 403 receives a registration request from a second communication device, the registration request include a second communication device identifier identifying the second communication device.

In block 1503, the processing circuitry 403 performs a lookup in the cache memory for the second communication device identifier. Responsive to finding a match in one of one or more communication device ranges in the cache memory, the processing circuitry 403 in block 1505 selects a unified data management, UDM, function/node 108 belonging to the groupId for the one of the one or more communication device ranges for the second communication device. Thus, the AMF function/node selects a UDM function/node without contacting the NRF function/node 112.

Operations of a unified data management, UDM, function/node 108 (implemented using the structure of FIG. 5) will now be discussed with reference to the flow chart of FIG. 16 according to some embodiments of inventive concepts. For example, modules may be stored in memory 505 of FIG. 5, and these modules may provide instructions so that when the instructions of a module are executed by respective UDM function/node processing circuitry 503, processing circuitry 503 performs respective operations of the flow chart.

Figure 16:
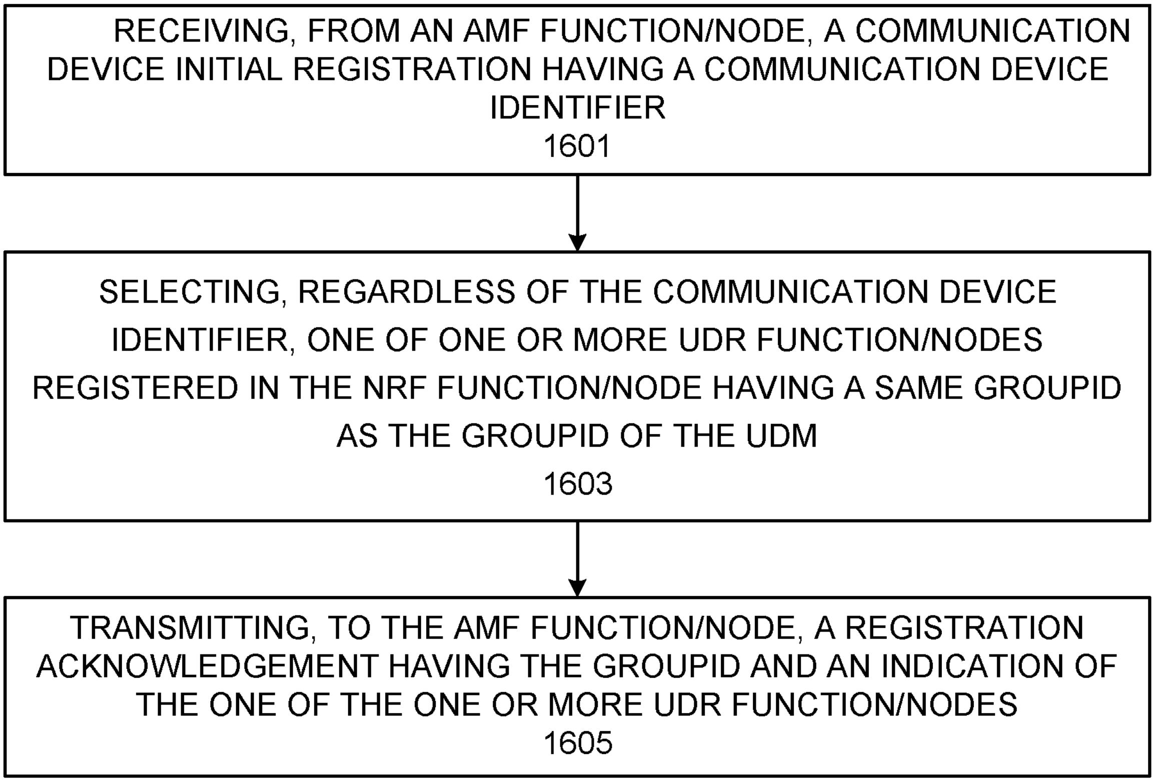
FIGS. 16-17 are flow charts illustrating operations of a UDM function/node according to some embodiments of inventive concepts.

Turning to FIG. 16, in block 1601, the processing circuitry 503 receives from an access and mobility management function, AMF, function/node 106, a communication device initial registration having a communication device identifier.

In block 1603, the processing circuitry 503 selects, regardless of the communication device identifier, one of one or more user and data repository, UDR, function/nodes (110) registered in the NRF function/node (112) having a same group identifier, groupId, as the groupId of the UDM. In block 1605, the processing circuitry 503 transmits to the AMF function/node (106) a registration acknowledgement having the groupId and an indication of the one of the one or more UDR function/nodes 108.

Figure 17:
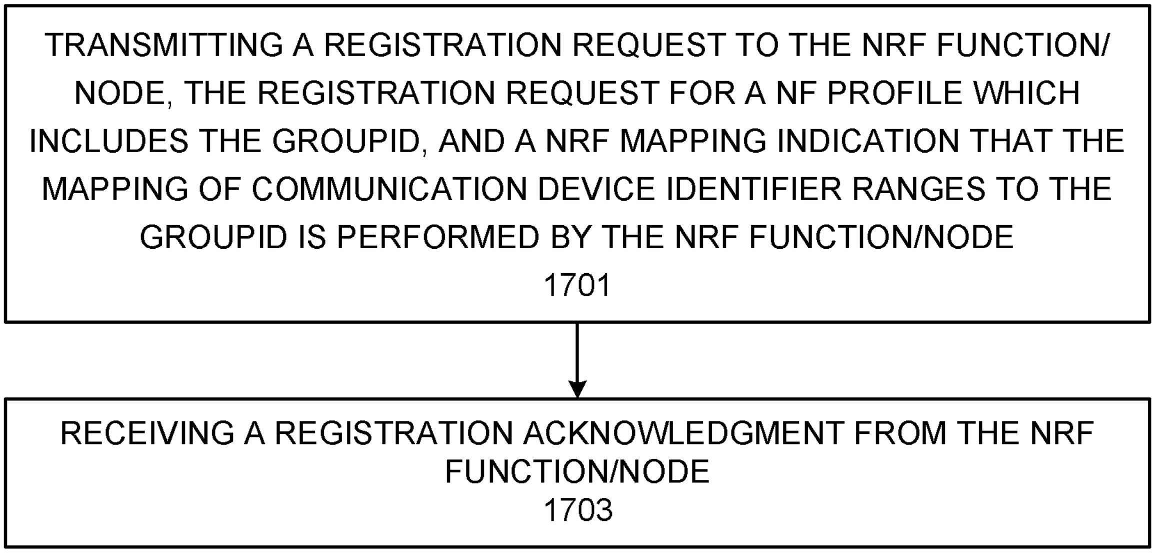

In order for the UDM function/node 108 to select the UDR function/node, the UDM function/node 108 needs to register with the NRF function/node 112. Turning to FIG. 17, in block 1701, the processing circuitry 503 transmits a registration request to the NRF function/node 112, the registration request for a network function, NF, profile which includes the groupId, and a NRF mapping indication that the mapping of communication device identifier ranges to the groupId is performed by the NRF function/node. In block 1703, the processing circuitry 503 receives a registration acknowledgment from the NRF function/node.

Thus, as can be seen, a method for routing requests associated to a 5GC user by progressive discovery of the deployment has been described. Between a NF and NRF, a new attribute is published (via extended NRF API) in the NF profile indicating that mapping of SUPI ranges information is centralized in the NRF.

Between a NF consumer and NRF, an indication (extension) in the NRF API towards NF consumer indicating that further routing information can be provided related to received user (SUPI) is provided. A new/extended API offered by NRF API and consumed by all NF consumers allows the NF consumers to request for further routing information related to a user (SUPI) and its related SUPI range, process known as progressive learning only the traffic requires it.

Additionally, a new/extended API to request notification for changes in the GroupId ranges in NRF, by indicating additionally that either all modifications (addition/deletion of ranges) are to be notified, or only deleted ranges are required (to assist the progressive discovery of the newly added ranges) is provided.

Inside a NF consumer, a method in the NF consumer to cache this routing information learned and use it for all SUPIs under same SUPI range is provided. Another method in the NF consumer applies a wider concept of GroupId shared across different NF types to avoid SUPI lookups in purely segmented/clustered networks. Another method in the NF to know that same GroupId used for received SUPI is extensible for the UDR so no UDR discovery must be performed towards NRF.

Example embodiments are discussed below.

Explanations are provided below for various abbreviations/acronyms used in the present disclosure.

| Abbreviation | Explanation |
|---|---|
| 5GC | 5G Core |
| 5GS | 5G System |
| AF | Application Function |
| AMF | Access and Mobility Management Function |
| AS | Application Server |
| EPS | Evolved Packet System |
| FE | Front End |
| HSS | Home Subscriber Server |
| MME | Mobility Management Function |
| NEF | Network Exposure Function |
| NF | Network Function |
| SCEF | Service Capability Exposure Function |
| SCS | Service Capability Server |
| UDM | Unified Data Management |
| UDR | User and Data Repository |
| UE | User Equipment |

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 18:
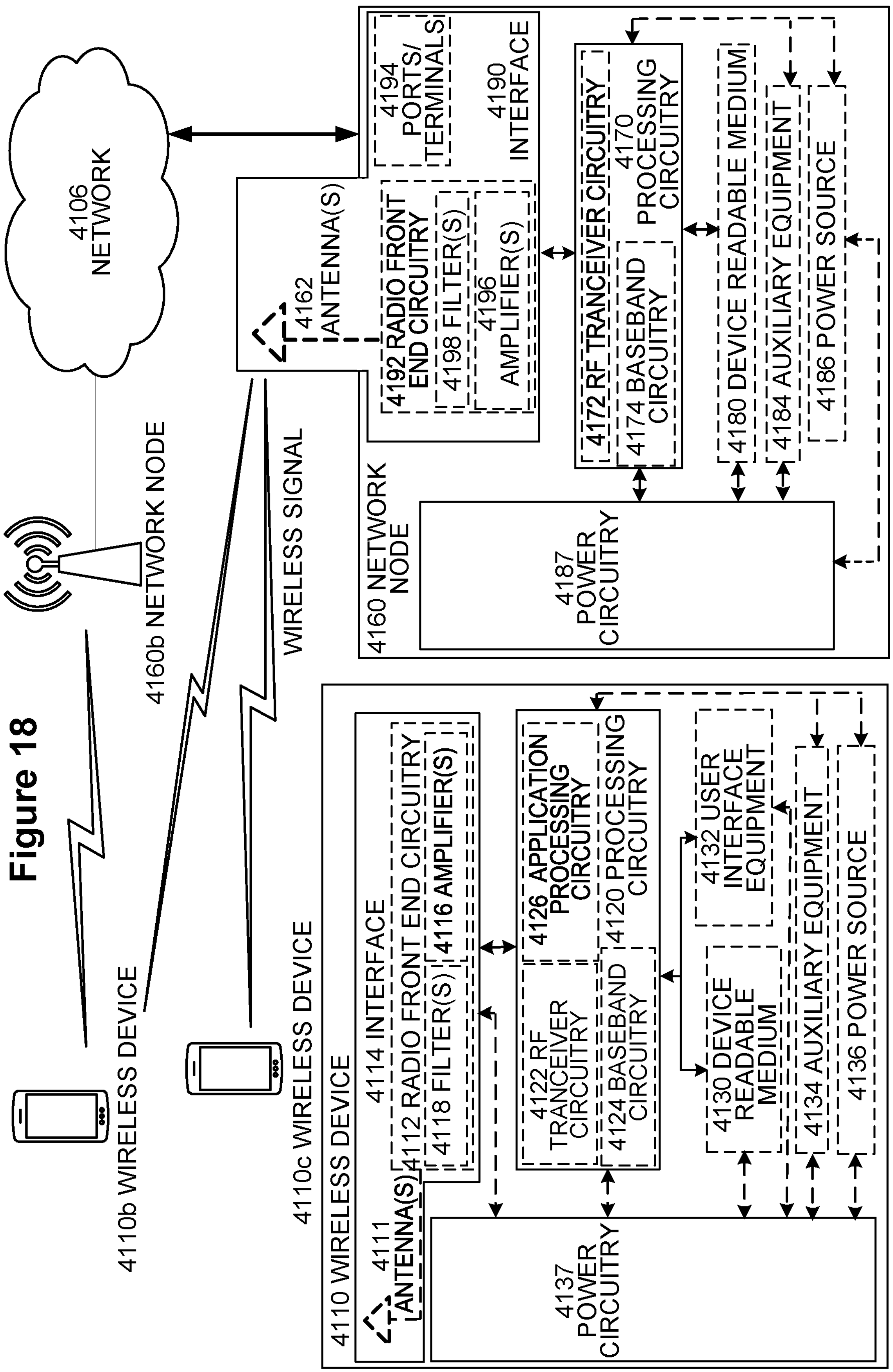
FIG. 18 is a block diagram of a wireless network in accordance with some embodiments.

FIG. 18 illustrates a wireless network in accordance with some embodiments.

Although the subject matter described herein may be implemented in any appropriate type of system using any suitable components, the embodiments disclosed herein are described in relation to a wireless network, such as the example wireless network illustrated in FIG. 18. For simplicity, the wireless network of FIG. 18 only depicts network 4106, network nodes 4160 and 4160*b*, and WDs 4110, 4110*b*, and 4110*c* (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node 4160 and wireless device (WD) 4110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 4106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 4160 and WD 4110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 18, network node 4160 includes processing circuitry 4170, device readable medium 4180, interface 4190, auxiliary equipment 4184, power source 4186, power circuitry 4187, and antenna 4162. Although network node 4160 illustrated in the example wireless network of FIG. 18 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 4160 are depicted as single boxes located within a larger box, or nested within multiple boxes, in practice, a network node may comprise multiple different physical components that make up a single illustrated component (e.g., device readable medium 4180 may comprise multiple separate hard drives as well as multiple RAM modules).

Similarly, network node 4160 may be composed of multiple physically separate components (e.g., a NodeB component and a RNC component, or a BTS component and a BSC component, etc.), which may each have their own respective components. In certain scenarios in which network node 4160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 4160 may be configured to support multiple radio access technologies (RATs). In such embodiments, some components may be duplicated (e.g., separate device readable medium 4180 for the different RATs) and some components may be reused (e.g., the same antenna 4162 may be shared by the RATs). Network node 4160 may also include multiple sets of the various illustrated components for different wireless technologies integrated into network node 4160, such as, for example, GSM, WCDMA, LTE, NR, WiFi, or Bluetooth wireless technologies. These wireless technologies may be integrated into the same or different chip or set of chips and other components within network node 4160.

Processing circuitry 4170 is configured to perform any determining, calculating, or similar operations (e.g., certain obtaining operations) described herein as being provided by a network node. These operations performed by processing circuitry 4170 may include processing information obtained by processing circuitry 4170 by, for example, converting the obtained information into other information, comparing the obtained information or converted information to information stored in the network node, and/or performing one or more operations based on the obtained information or converted information, and as a result of said processing making a determination.

Processing circuitry 4170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 4160 components, such as device readable medium 4180, network node 4160 functionality. For example, processing circuitry 4170 may execute instructions stored in device readable medium 4180 or in memory within processing circuitry 4170. Such functionality may include providing any of the various wireless features, functions, or benefits discussed herein. In some embodiments, processing circuitry 4170 may include a system on a chip (SOC).

In some embodiments, processing circuitry 4170 may include one or more of radio frequency (RF) transceiver circuitry 4172 and baseband processing circuitry 4174. In some embodiments, radio frequency (RF) transceiver circuitry 4172 and baseband processing circuitry 4174 may be on separate chips (or sets of chips), boards, or units, such as radio units and digital units. In alternative embodiments, part or all of RF transceiver circuitry 4172 and baseband processing circuitry 4174 may be on the same chip or set of chips, boards, or units.

In certain embodiments, some or all of the functionality described herein as being provided by a network node, base station, eNB or other such network device may be performed by processing circuitry 4170 executing instructions stored on device readable medium 4180 or memory within processing circuitry 4170. In alternative embodiments, some or all of the functionality may be provided by processing circuitry 4170 without executing instructions stored on a separate or discrete device readable medium, such as in a hard-wired manner. In any of those embodiments, whether executing instructions stored on a device readable storage medium or not, processing circuitry 4170 can be configured to perform the described functionality. The benefits provided by such functionality are not limited to processing circuitry 4170 alone or to other components of network node 4160, but are enjoyed by network node 4160 as a whole, and/or by end users and the wireless network generally.

Device readable medium 4180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 4170. Device readable medium 4180 may store any suitable instructions, data or information, including a computer program, software, an application including one or more of logic, rules, code, tables, etc. and/or other instructions capable of being executed by processing circuitry 4170 and, utilized by network node 4160. Device readable medium 4180 may be used to store any calculations made by processing circuitry 4170 and/or any data received via interface 4190. In some embodiments, processing circuitry 4170 and device readable medium 4180 may be considered to be integrated.

Interface 4190 is used in the wired or wireless communication of signalling and/or data between network node 4160, network 4106, and/or WDs 4110. As illustrated, interface 4190 comprises port(s)/terminal(s) 4194 to send and receive data, for example to and from network 4106 over a wired connection. Interface 4190 also includes radio front end circuitry 4192 that may be coupled to, or in certain embodiments a part of, antenna 4162. Radio front end circuitry 4192 comprises filters 4198 and amplifiers 4196. Radio front end circuitry 4192 may be connected to antenna 4162 and processing circuitry 4170. Radio front end circuitry may be configured to condition signals communicated between antenna 4162 and processing circuitry 4170. Radio front end circuitry 4192 may receive digital data that is to be sent out to other network nodes or WDs via a wireless connection. Radio front end circuitry 4192 may convert the digital data into a radio signal having the appropriate channel and bandwidth parameters using a combination of filters 4198 and/or amplifiers 4196. The radio signal may then be transmitted via antenna 4162. Similarly, when receiving data, antenna 4162 may collect radio signals which are then converted into digital data by radio front end circuitry 4192. The digital data may be passed to processing circuitry 4170. In other embodiments, the interface may comprise different components and/or different combinations of components.

In certain alternative embodiments, network node 4160 may not include separate radio front end circuitry 4192, instead, processing circuitry 4170 may comprise radio front end circuitry and may be connected to antenna 4162 without separate radio front end circuitry 4192. Similarly, in some embodiments, all or some of RF transceiver circuitry 4172 may be considered a part of interface 4190. In still other embodiments, interface 4190 may include one or more ports or terminals 4194, radio front end circuitry 4192, and RF transceiver circuitry 4172, as part of a radio unit (not shown), and interface 4190 may communicate with baseband processing circuitry 4174, which is part of a digital unit (not shown).

Antenna 4162 may include one or more antennas, or antenna arrays, configured to send and/or receive wireless signals. Antenna 4162 may be coupled to radio front end circuitry 4192 and may be any type of antenna capable of transmitting and receiving data and/or signals wirelessly. In some embodiments, antenna 4162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 4162 may be separate from network node 4160 and may be connectable to network node 4160 through an interface or port.

Antenna 4162, interface 4190, and/or processing circuitry 4170 may be configured to perform any receiving operations and/or certain obtaining operations described herein as being performed by a network node. Any information, data and/or signals may be received from a wireless device, another network node and/or any other network equipment. Similarly, antenna 4162, interface 4190, and/or processing circuitry 4170 may be configured to perform any transmitting operations described herein as being performed by a network node. Any information, data and/or signals may be transmitted to a wireless device, another network node and/or any other network equipment.

Power circuitry 4187 may comprise, or be coupled to, power management circuitry and is configured to supply the components of network node 4160 with power for performing the functionality described herein. Power circuitry 4187 may receive power from power source 4186. Power source 4186 and/or power circuitry 4187 may be configured to provide power to the various components of network node 4160 in a form suitable for the respective components (e.g., at a voltage and current level needed for each respective component). Power source 4186 may either be included in, or external to, power circuitry 4187 and/or network node 4160. For example, network node 4160 may be connectable to an external power source (e.g., an electricity outlet) via an input circuitry or interface such as an electrical cable, whereby the external power source supplies power to power circuitry 4187. As a further example, power source 4186 may comprise a source of power in the form of a battery or battery pack which is connected to, or integrated in, power circuitry 4187. The battery may provide backup power should the external power source fail. Other types of power sources, such as photovoltaic devices, may also be used.

Alternative embodiments of network node 4160 may include additional components beyond those shown in FIG. 18 that may be responsible for providing certain aspects of the network node's functionality, including any of the functionality described herein and/or any functionality necessary to support the subject matter described herein. For example, network node 4160 may include user interface equipment to allow input of information into network node 4160 and to allow output of information from network node 4160. This may allow a user to perform diagnostic, maintenance, repair, and other administrative functions for network node 4160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 4110 includes antenna 4111, interface 4114, processing circuitry 4120, device readable medium 4130, user interface equipment 4132, auxiliary equipment 4134, power source 4136 and power circuitry 4137. WD 4110 may include multiple sets of one or more of the illustrated components for different wireless technologies supported by WD 4110, such as, for example, GSM, WCDMA, LTE, NR, WiFi, WiMAX, or Bluetooth wireless technologies, just to mention a few. These wireless technologies may be integrated into the same or different chips or set of chips as other components within WD 4110.

Antenna 4111 may include one or more antennas or antenna arrays, configured to send and/or receive wireless signals, and is connected to interface 4114. In certain alternative embodiments, antenna 4111 may be separate from WD 4110 and be connectable to WD 4110 through an interface or port. Antenna 4111, interface 4114, and/or processing circuitry 4120 may be configured to perform any receiving or transmitting operations described herein as being performed by a WD. Any information, data and/or signals may be received from a network node and/or another WD. In some embodiments, radio front end circuitry and/or antenna 4111 may be considered an interface.

As illustrated, interface 4114 comprises radio front end circuitry 4112 and antenna 4111. Radio front end circuitry 4112 comprise one or more filters 4118 and amplifiers 4116. Radio front end circuitry 4112 is connected to antenna 4111 and processing circuitry 4120, and is configured to condition signals communicated between antenna 4111 and processing circuitry 4120. Radio front end circuitry 4112 may be coupled to or a part of antenna 4111. In some embodiments, WD 4110 may not include separate radio front end circuitry 4112; rather, processing circuitry 4120 may comprise radio front end circuitry and may be connected to antenna 4111. Similarly, in some embodiments, some or all of RF transceiver circuitry 4122 may be considered a part of interface 4114. Radio front end circuitry 4112 may receive digital data that is to be sent out to other network nodes or WDs via a wireless connection. Radio front end circuitry 4112 may convert the digital data into a radio signal having the appropriate channel and bandwidth parameters using a combination of filters 4118 and/or amplifiers 4116. The radio signal may then be transmitted via antenna 4111. Similarly, when receiving data, antenna 4111 may collect radio signals which are then converted into digital data by radio front end circuitry 4112. The digital data may be passed to processing circuitry 4120. In other embodiments, the interface may comprise different components and/or different combinations of components.

Processing circuitry 4120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 4110 components, such as device readable medium 4130, WD 4110 functionality. Such functionality may include providing any of the various wireless features or benefits discussed herein. For example, processing circuitry 4120 may execute instructions stored in device readable medium 4130 or in memory within processing circuitry 4120 to provide the functionality disclosed herein.

As illustrated, processing circuitry 4120 includes one or more of RF transceiver circuitry 4122, baseband processing circuitry 4124, and application processing circuitry 4126. In other embodiments, the processing circuitry may comprise different components and/or different combinations of components. In certain embodiments processing circuitry 4120 of WD 4110 may comprise a SOC. In some embodiments, RF transceiver circuitry 4122, baseband processing circuitry 4124, and application processing circuitry 4126 may be on separate chips or sets of chips. In alternative embodiments, part or all of baseband processing circuitry 4124 and application processing circuitry 4126 may be combined into one chip or set of chips, and RF transceiver circuitry 4122 may be on a separate chip or set of chips. In still alternative embodiments, part or all of RF transceiver circuitry 4122 and baseband processing circuitry 4124 may be on the same chip or set of chips, and application processing circuitry 4126 may be on a separate chip or set of chips. In yet other alternative embodiments, part or all of RF transceiver circuitry 4122, baseband processing circuitry 4124, and application processing circuitry 4126 may be combined in the same chip or set of chips. In some embodiments, RF transceiver circuitry 4122 may be a part of interface 4114. RF transceiver circuitry 4122 may condition RF signals for processing circuitry 4120.

In certain embodiments, some or all of the functionality described herein as being performed by a WD may be provided by processing circuitry 4120 executing instructions stored on device readable medium 4130, which in certain embodiments may be a computer-readable storage medium. In alternative embodiments, some or all of the functionality may be provided by processing circuitry 4120 without executing instructions stored on a separate or discrete device readable storage medium, such as in a hard-wired manner. In any of those particular embodiments, whether executing instructions stored on a device readable storage medium or not, processing circuitry 4120 can be configured to perform the described functionality. The benefits provided by such functionality are not limited to processing circuitry 4120 alone or to other components of WD 4110, but are enjoyed by WD 4110 as a whole, and/or by end users and the wireless network generally.

Processing circuitry 4120 may be configured to perform any determining, calculating, or similar operations (e.g., certain obtaining operations) described herein as being performed by a WD. These operations, as performed by processing circuitry 4120, may include processing information obtained by processing circuitry 4120 by, for example, converting the obtained information into other information, comparing the obtained information or converted information to information stored by WD 4110, and/or performing one or more operations based on the obtained information or converted information, and as a result of said processing making a determination.

Device readable medium 4130 may be operable to store a computer program, software, an application including one or more of logic, rules, code, tables, etc. and/or other instructions capable of being executed by processing circuitry 4120. Device readable medium 4130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 4120. In some embodiments, processing circuitry 4120 and device readable medium 4130 may be considered to be integrated.

User interface equipment 4132 may provide components that allow for a human user to interact with WD 4110. Such interaction may be of many forms, such as visual, audial, tactile, etc. User interface equipment 4132 may be operable to produce output to the user and to allow the user to provide input to WD 4110. The type of interaction may vary depending on the type of user interface equipment 4132 installed in WD 4110. For example, if WD 4110 is a smart phone, the interaction may be via a touch screen; if WD 4110 is a smart meter, the interaction may be through a screen that provides usage (e.g., the number of gallons used) or a speaker that provides an audible alert (e.g., if smoke is detected). User interface equipment 4132 may include input interfaces, devices and circuits, and output interfaces, devices and circuits. User interface equipment 4132 is configured to allow input of information into WD 4110, and is connected to processing circuitry 4120 to allow processing circuitry 4120 to process the input information. User interface equipment 4132 may include, for example, a microphone, a proximity or other sensor, keys/buttons, a touch display, one or more cameras, a USB port, or other input circuitry. User interface equipment 4132 is also configured to allow output of information from WD 4110, and to allow processing circuitry 4120 to output information from WD 4110. User interface equipment 4132 may include, for example, a speaker, a display, vibrating circuitry, a USB port, a headphone interface, or other output circuitry. Using one or more input and output interfaces, devices, and circuits, of user interface equipment 4132, WD 4110 may communicate with end users and/or the wireless network, and allow them to benefit from the functionality described herein.

Auxiliary equipment 4134 is operable to provide more specific functionality which may not be generally performed by WDs. This may comprise specialized sensors for doing measurements for various purposes, interfaces for additional types of communication such as wired communications etc. The inclusion and type of components of auxiliary equipment 4134 may vary depending on the embodiment and/or scenario.

Power source 4136 may, in some embodiments, be in the form of a battery or battery pack. Other types of power sources, such as an external power source (e.g., an electricity outlet), photovoltaic devices or power cells, may also be used. WD 4110 may further comprise power circuitry 4137 for delivering power from power source 4136 to the various parts of WD 4110 which need power from power source 4136 to carry out any functionality described or indicated herein. Power circuitry 4137 may in certain embodiments comprise power management circuitry. Power circuitry 4137 may additionally or alternatively be operable to receive power from an external power source; in which case WD 4110 may be connectable to the external power source (such as an electricity outlet) via input circuitry or an interface such as an electrical power cable. Power circuitry 4137 may also in certain embodiments be operable to deliver power from an external power source to power source 4136. This may be, for example, for the charging of power source 4136. Power circuitry 4137 may perform any formatting, converting, or other modification to the power from power source 4136 to make the power suitable for the respective components of WD 4110 to which power is supplied.

Figure 19:
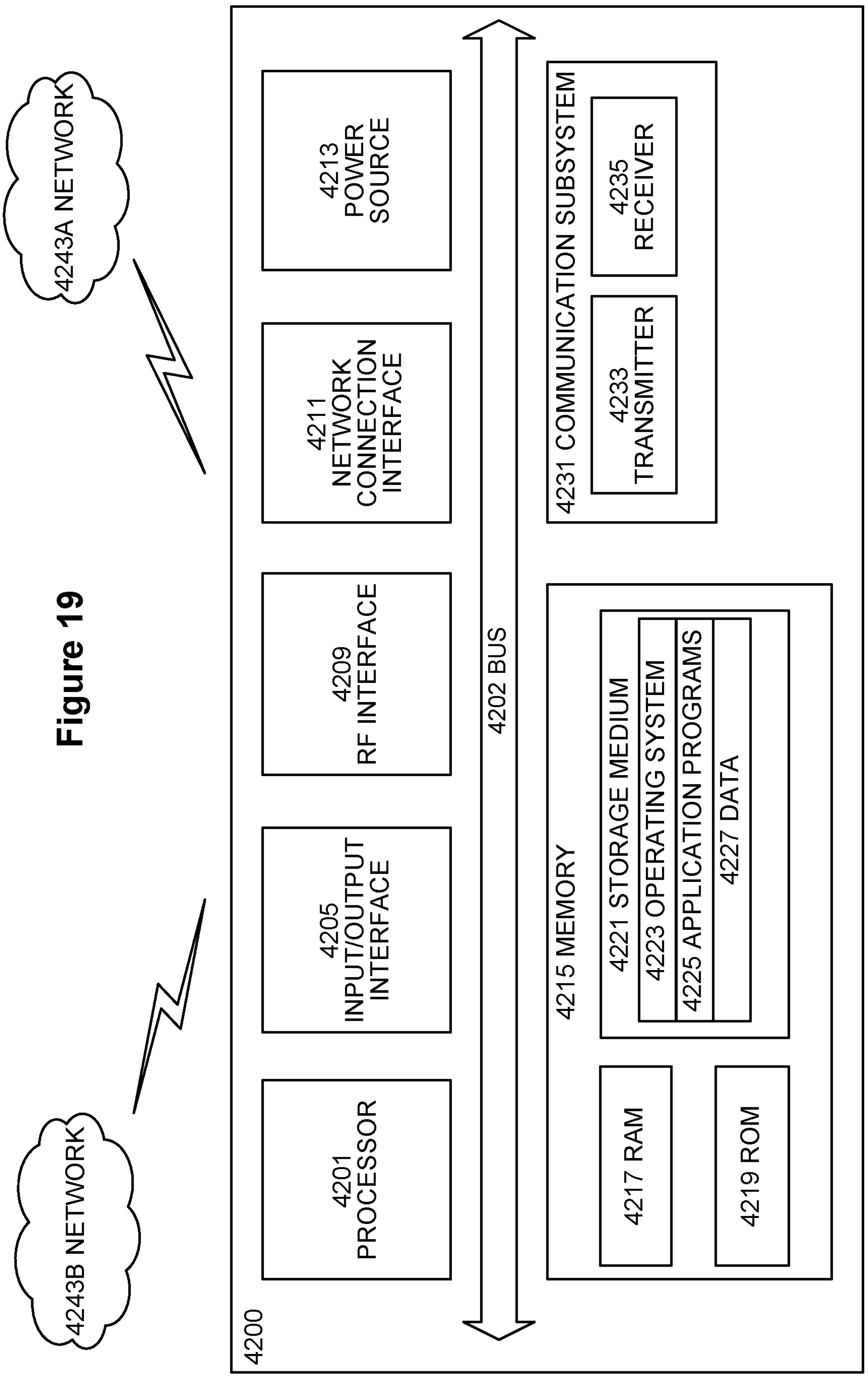
FIG. 19 is a block diagram of a user equipment in accordance with some embodiments.

FIG. 19 illustrates a user Equipment in accordance with some embodiments.

FIG. 19 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 42200 may be any UE identified by the 3rd Generation Partnership Project (3GPP), including a NB-IoT UE, a machine type communication (MTC) UE, and/or an enhanced MTC (eMTC) UE. UE 4200, as illustrated in FIG. 19, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 19 is a UE, the components discussed herein are equally applicable to a WD, and vice-versa.

In FIG. 19, UE 4200 includes processing circuitry 4201 that is operatively coupled to input/output interface 4205, radio frequency (RF) interface 4209, network connection interface 4211, memory 4215 including random access memory (RAM) 4217, read-only memory (ROM) 4219, and storage medium 4221 or the like, communication subsystem 4231, power source 4213, and/or any other component, or any combination thereof. Storage medium 4221 includes operating system 4223, application program 4225, and data 4227. In other embodiments, storage medium 4221 may include other similar types of information. Certain UEs may utilize all of the components shown in FIG. 19, or only a subset of the components. The level of integration between the components may vary from one UE to another UE. Further, certain UEs may contain multiple instances of a component, such as multiple processors, memories, transceivers, transmitters, receivers, etc.

In FIG. 19, processing circuitry 4201 may be configured to process computer instructions and data. Processing circuitry 4201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 4201 may include two central processing units (CPUs). Data may be information in a form suitable for use by a computer.

In the depicted embodiment, input/output interface 4205 may be configured to provide a communication interface to an input device, output device, or input and output device. UE 4200 may be configured to use an output device via input/output interface 4205. An output device may use the same type of interface port as an input device. For example, a USB port may be used to provide input to and output from UE 4200. The output device may be a speaker, a sound card, a video card, a display, a monitor, a printer, an actuator, an emitter, a smartcard, another output device, or any combination thereof. UE 4200 may be configured to use an input device via input/output interface 4205 to allow a user to capture information into UE 4200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 19, RF interface 4209 may be configured to provide a communication interface to RF components such as a transmitter, a receiver, and an antenna. Network connection interface 4211 may be configured to provide a communication interface to network 4243*a*. Network 4243*a* may encompass wired and/or wireless networks such as a local-area network (LAN), a wide-area network (WAN), a computer network, a wireless network, a telecommunications network, another like network or any combination thereof. For example, network 4243*a* may comprise a Wi-Fi network. Network connection interface 4211 may be configured to include a receiver and a transmitter interface used to communicate with one or more other devices over a communication network according to one or more communication protocols, such as Ethernet, TCP/IP, SONET, ATM, or the like. Network connection interface 4211 may implement receiver and transmitter functionality appropriate to the communication network links (e.g., optical, electrical, and the like). The transmitter and receiver functions may share circuit components, software or firmware, or alternatively may be implemented separately.

RAM 4217 may be configured to interface via bus 4202 to processing circuitry 4201 to provide storage or caching of data or computer instructions during the execution of software programs such as the operating system, application programs, and device drivers. ROM 4219 may be configured to provide computer instructions or data to processing circuitry 4201. For example, ROM 4219 may be configured to store invariant low-level system code or data for basic system functions such as basic input and output (I/O), startup, or reception of keystrokes from a keyboard that are stored in a non-volatile memory. Storage medium 4221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 4221 may be configured to include operating system 4223, application program 4225 such as a web browser application, a widget or gadget engine or another application, and data file 4227. Storage medium 4221 may store, for use by UE 4200, any of a variety of various operating systems or combinations of operating systems.

Storage medium 4221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 4221 may allow UE 4200 to access computer-executable instructions, application programs or the like, stored on transitory or non-transitory memory media, to off-load data, or to upload data. An article of manufacture, such as one utilizing a communication system may be tangibly embodied in storage medium 4221, which may comprise a device readable medium.

In FIG. 19, processing circuitry 4201 may be configured to communicate with network 4243*b* using communication subsystem 4231. Network 4243*a* and network 4243*b* may be the same network or networks or different network or networks. Communication subsystem 4231 may be configured to include one or more transceivers used to communicate with network 4243*b*. For example, communication subsystem 4231 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 4233 and/or receiver 4235 to implement transmitter or receiver functionality, respectively, appropriate to the RAN links (e.g., frequency allocations and the like). Further, transmitter 4233 and receiver 4235 of each transceiver may share circuit components, software or firmware, or alternatively may be implemented separately.

In the illustrated embodiment, the communication functions of communication subsystem 4231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 4231 may include cellular communication, Wi-Fi communication, Bluetooth communication, and GPS communication. Network 4243*b* may encompass wired and/or wireless networks such as a local-area network (LAN), a wide-area network (WAN), a computer network, a wireless network, a telecommunications network, another like network or any combination thereof. For example, network 4243*b* may be a cellular network, a Wi-Fi network, and/or a near-field network. Power source 4213 may be configured to provide alternating current (AC) or direct current (DC) power to components of UE 4200.

The features, benefits and/or functions described herein may be implemented in one of the components of UE 4200 or partitioned across multiple components of UE 4200. Further, the features, benefits, and/or functions described herein may be implemented in any combination of hardware, software or firmware. In one example, communication subsystem 4231 may be configured to include any of the components described herein. Further, processing circuitry 4201 may be configured to communicate with any of such components over bus 4202. In another example, any of such components may be represented by program instructions stored in memory that when executed by processing circuitry 4201 perform the corresponding functions described herein. In another example, the functionality of any of such components may be partitioned between processing circuitry 4201 and communication subsystem 4231. In another example, the non-computationally intensive functions of any of such components may be implemented in software or firmware and the computationally intensive functions may be implemented in hardware.

Figure 20:
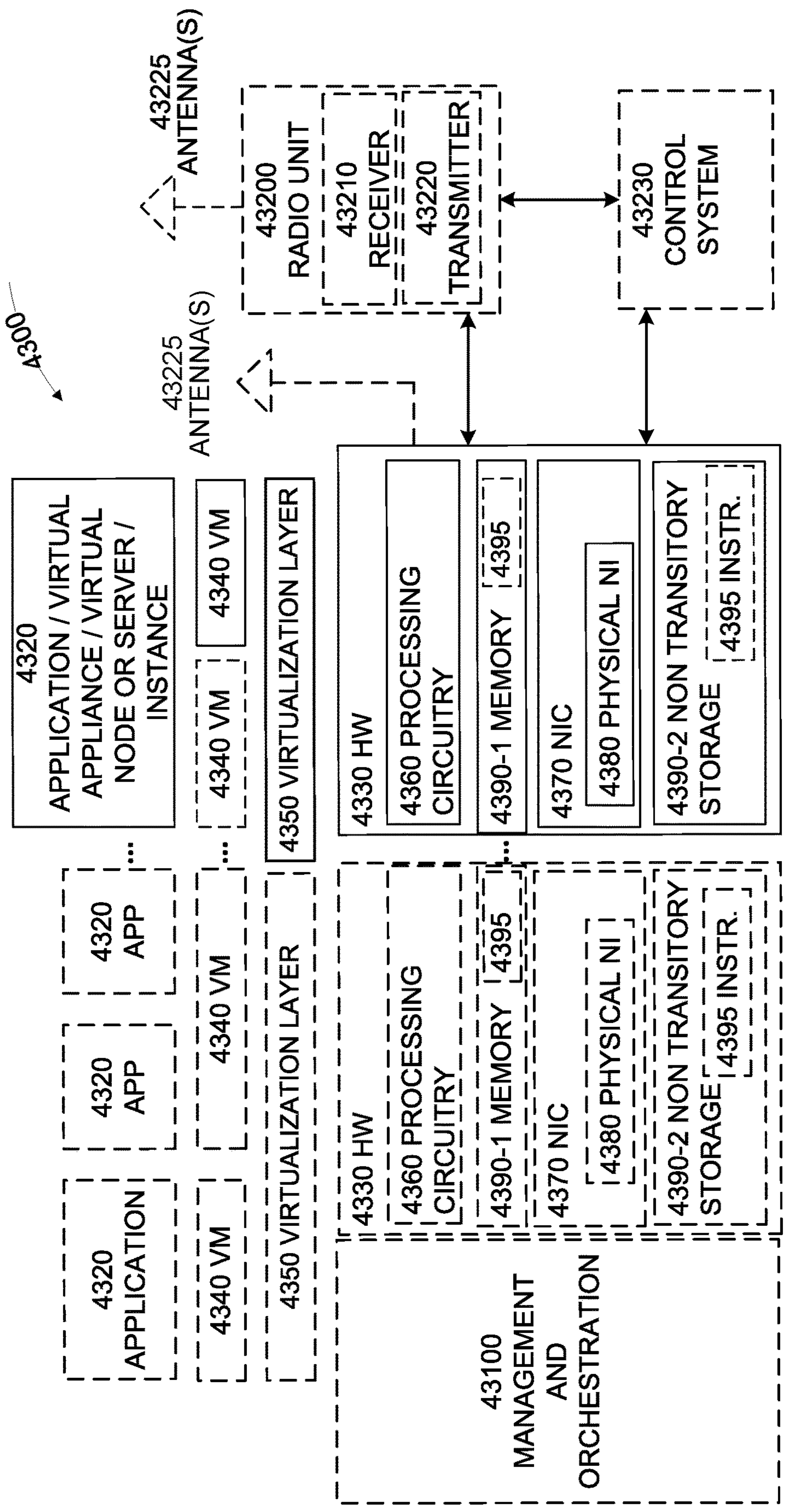
FIG. 20 is a block diagram of a virtualization environment in accordance with some embodiments.

FIG. 20 illustrates a virtualization environment in accordance with some embodiments.

FIG. 20 is a schematic block diagram illustrating a virtualization environment 4300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 4300 hosted by one or more of hardware nodes 4330. Further, in embodiments in which the virtual node is not a radio access node or does not require radio connectivity (e.g., a core network node), then the network node may be entirely virtualized.

The functions may be implemented by one or more applications 4320 (which may alternatively be called software instances, virtual appliances, network functions, virtual nodes, virtual network functions, etc.) operative to implement some of the features, functions, and/or benefits of some of the embodiments disclosed herein. Applications 4320 are run in virtualization environment 4300 which provides hardware 4330 comprising processing circuitry 4360 and memory 4390. Memory 4390 contains instructions 4395 executable by processing circuitry 4360 whereby application 4320 is operative to provide one or more of the features, benefits, and/or functions disclosed herein.

Virtualization environment 4300, comprises general-purpose or special-purpose network hardware devices 4330 comprising a set of one or more processors or processing circuitry 4360, which may be commercial off-the-shelf (COTS) processors, dedicated Application Specific Integrated Circuits (ASICs), or any other type of processing circuitry including digital or analog hardware components or special purpose processors. Each hardware device may comprise memory 4390-1 which may be non-persistent memory for temporarily storing instructions 4395 or software executed by processing circuitry 4360. Each hardware device may comprise one or more network interface controllers (NICs) 4370, also known as network interface cards, which include physical network interface 4380. Each hardware device may also include non-transitory, persistent, machine-readable storage media 4390-2 having stored therein software 4395 and/or instructions executable by processing circuitry 4360. Software 4395 may include any type of software including software for instantiating one or more virtualization layers 4350 (also referred to as hypervisors), software to execute virtual machines 4340 as well as software allowing it to execute functions, features and/or benefits described in relation with some embodiments described herein.

Virtual machines 4340 comprise virtual processing, virtual memory, virtual networking or interface and virtual storage, and may be run by a corresponding virtualization layer 4350 or hypervisor. Different embodiments of the instance of virtual appliance 4320 may be implemented on one or more of virtual machines 4340, and the implementations may be made in different ways.

During operation, processing circuitry 4360 executes software 4395 to instantiate the hypervisor or virtualization layer 4350, which may sometimes be referred to as a virtual machine monitor (VMM). Virtualization layer 4350 may present a virtual operating platform that appears like networking hardware to virtual machine 4340.

As shown in FIG. 20, hardware 4330 may be a standalone network node with generic or specific components. Hardware 4330 may comprise antenna 43225 and may implement some functions via virtualization. Alternatively, hardware 4330 may be part of a larger cluster of hardware (e.g. such as in a data center or customer premise equipment (CPE)) where many hardware nodes work together and are managed via management and orchestration (MANO) 43100, which, among others, oversees lifecycle management of applications 4320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 4340 may be a software implementation of a physical machine that runs programs as if they were executing on a physical, non-virtualized machine. Each of virtual machines 4340, and that part of hardware 4330 that executes that virtual machine, be it hardware dedicated to that virtual machine and/or hardware shared by that virtual machine with others of the virtual machines 4340, forms a separate virtual network elements (VNE).

Still in the context of NFV, Virtual Network Function (VNF) is responsible for handling specific network functions that run in one or more virtual machines 4340 on top of hardware networking infrastructure 4330 and corresponds to application 4320 in FIG. 20.

In some embodiments, one or more radio units 43200 that each include one or more transmitters 43220 and one or more receivers 43210 may be coupled to one or more antennas 43225. Radio units 43200 may communicate directly with hardware nodes 4330 via one or more appropriate network interfaces and may be used in combination with the virtual components to provide a virtual node with radio capabilities, such as a radio access node or a base station.

In some embodiments, some signalling can be effected with the use of control system 43230 which may alternatively be used for communication between the hardware nodes 4330 and radio units 43200.

Figure 21:
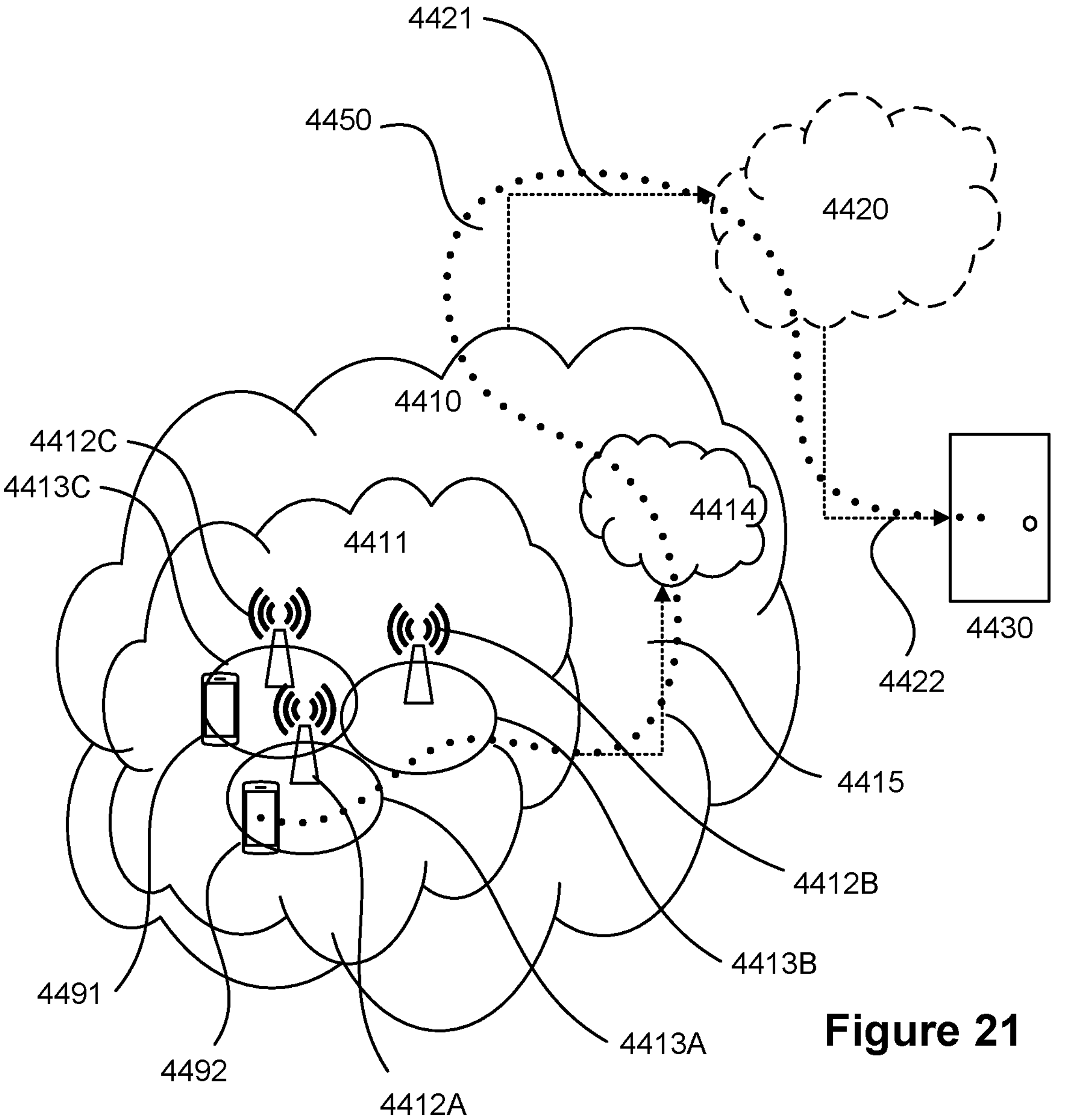
FIG. 21 is a block diagram of a telecommunication network connected via an intermediate network to a host computer in accordance with some embodiments.

FIG. 21 illustrates a telecommunication network connected via an intermediate network to a host computer in accordance with some embodiments.

With reference to FIG. 21, in accordance with an embodiment, a communication system includes telecommunication network 4410, such as a 3GPP-type cellular network, which comprises access network 4411, such as a radio access network, and core network 4414. Access network 4411 comprises a plurality of base stations 4412*a*, 4412*b*, 4412*c*, such as NBs, eNBs, gNBs or other types of wireless access points, each defining a corresponding coverage area 4413*a*, 4413*b*, 4413*c*. Each base station 4412*a*, 4412*b*, 4412*c* is connectable to core network 4414 over a wired or wireless connection 4415. A first UE 4491 located in coverage area 4413*c* is configured to wirelessly connect to, or be paged by, the corresponding base station 4412*c*. A second UE 4492 in coverage area 4413*a* is wirelessly connectable to the corresponding base station 4412*a*. While a plurality of UEs 4491, 4492 are illustrated in this example, the disclosed embodiments are equally applicable to a situation where a sole UE is in the coverage area or where a sole UE is connecting to the corresponding base station 4412.

Telecommunication network 4410 is itself connected to host computer 4430, which may be embodied in the hardware and/or software of a standalone server, a cloud-implemented server, a distributed server or as processing resources in a server farm. Host computer 4430 may be under the ownership or control of a service provider, or may be operated by the service provider or on behalf of the service provider. Connections 4421 and 4422 between telecommunication network 4410 and host computer 4430 may extend directly from core network 4414 to host computer 4430 or may go via an optional intermediate network 4420. Intermediate network 4420 may be one of, or a combination of more than one of, a public, private or hosted network; intermediate network 4420, if any, may be a backbone network or the Internet; in particular, intermediate network 4420 may comprise two or more sub-networks (not shown).

The communication system of FIG. 21 as a whole enables connectivity between the connected UEs 4491, 4492 and host computer 4430. The connectivity may be described as an over-the-top (OTT) connection 4450. Host computer 4430 and the connected UEs 4491, 4492 are configured to communicate data and/or signaling via OTT connection 4450, using access network 4411, core network 4414, any intermediate network 4420 and possible further infrastructure (not shown) as intermediaries. OTT connection 4450 may be transparent in the sense that the participating communication devices through which OTT connection 4450 passes are unaware of routing of uplink and downlink communications. For example, base station 4412 may not or need not be informed about the past routing of an incoming downlink communication with data originating from host computer 4430 to be forwarded (e.g., handed over) to a connected UE 4491. Similarly, base station 4412 need not be aware of the future routing of an outgoing uplink communication originating from the UE 4491 towards the host computer 4430.

Figure 22:
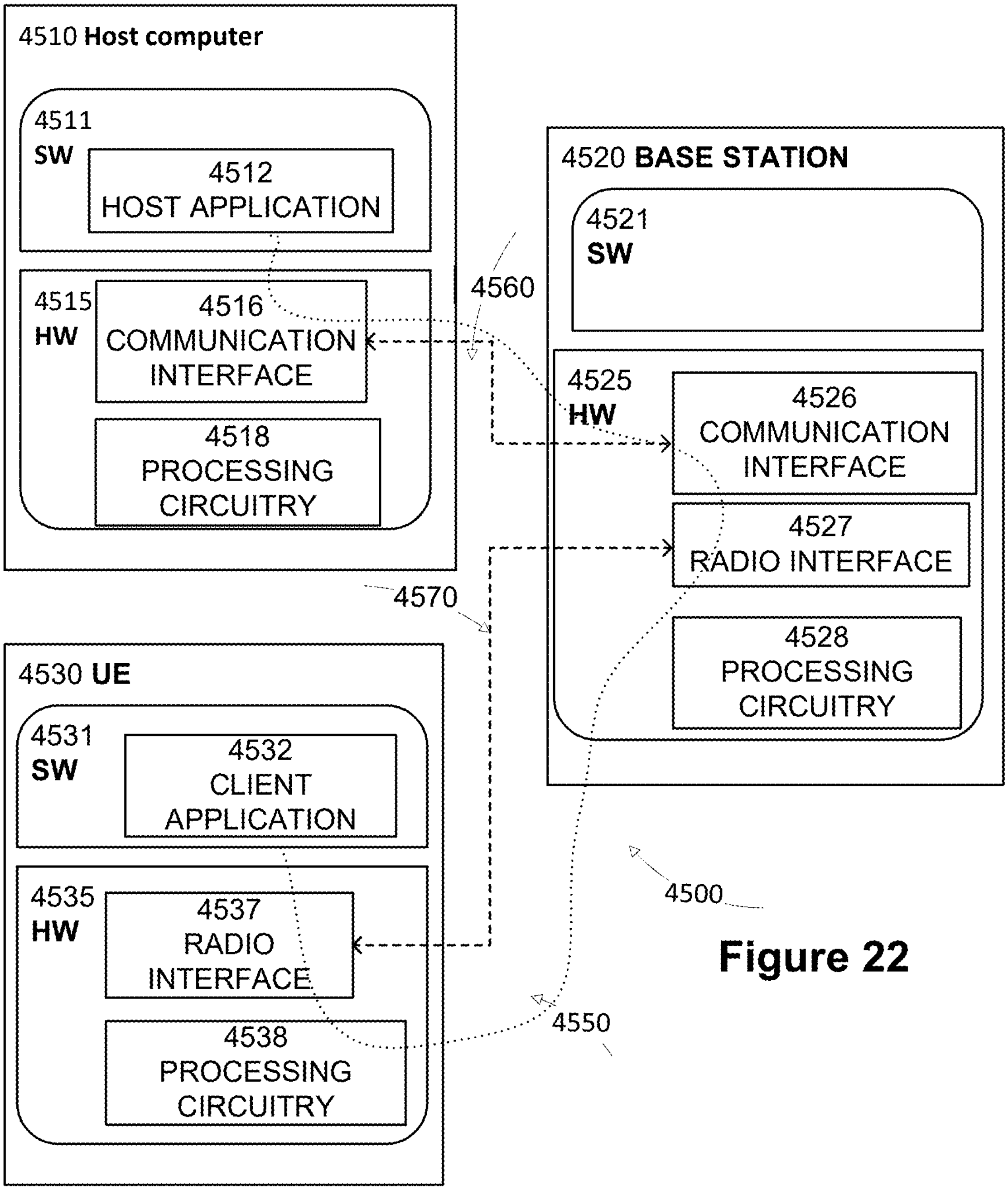
FIG. 22 is a block diagram of a host computer communicating via a base station with a user equipment over a partially wireless connection in accordance with some embodiments.

FIG. 22 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 22. In communication system 4500, host computer 4510 comprises hardware 4515 including communication interface 4516 configured to set up and maintain a wired or wireless connection with an interface of a different communication device of communication system 4500. Host computer 4510 further comprises processing circuitry 4518, which may have storage and/or processing capabilities. In particular, processing circuitry 4518 may comprise one or more programmable processors, application-specific integrated circuits, field programmable gate arrays or combinations of these (not shown) adapted to execute instructions. Host computer 4510 further comprises software 4511, which is stored in or accessible by host computer 4510 and executable by processing circuitry 4518. Software 4511 includes host application 4512. Host application 4512 may be operable to provide a service to a remote user, such as UE 4530 connecting via OTT connection 4550 terminating at UE 4530 and host computer 4510. In providing the service to the remote user, host application 4512 may provide user data which is transmitted using OTT connection 4550.

Communication system 4500 further includes base station 4520 provided in a telecommunication system and comprising hardware 4525 enabling it to communicate with host computer 4510 and with UE 4530. Hardware 4525 may include communication interface 4526 for setting up and maintaining a wired or wireless connection with an interface of a different communication device of communication system 4500, as well as radio interface 4527 for setting up and maintaining at least wireless connection 4570 with UE 4530 located in a coverage area (not shown in FIG. 22) served by base station 4520. Communication interface 4526 may be configured to facilitate connection 4560 to host computer 4510. Connection 4560 may be direct or it may pass through a core network (not shown in FIG. 22) of the telecommunication system and/or through one or more intermediate networks outside the telecommunication system. In the embodiment shown, hardware 4525 of base station 4520 further includes processing circuitry 4528, which may comprise one or more programmable processors, application-specific integrated circuits, field programmable gate arrays or combinations of these (not shown) adapted to execute instructions. Base station 4520 further has software 4521 stored internally or accessible via an external connection.

Communication system 4500 further includes UE 4530 already referred to. Its hardware 4535 may include radio interface 4537 configured to set up and maintain wireless connection 4570 with a base station serving a coverage area in which UE 4530 is currently located. Hardware 4535 of UE 4530 further includes processing circuitry 4538, which may comprise one or more programmable processors, application-specific integrated circuits, field programmable gate arrays or combinations of these (not shown) adapted to execute instructions. UE 4530 further comprises software 4531, which is stored in or accessible by UE 4530 and executable by processing circuitry 4538. Software 4531 includes client application 4532. Client application 4532 may be operable to provide a service to a human or non-human user via UE 4530, with the support of host computer 4510. In host computer 4510, an executing host application 4512 may communicate with the executing client application 4532 via OTT connection 4550 terminating at UE 4530 and host computer 4510. In providing the service to the user, client application 4532 may receive request data from host application 4512 and provide user data in response to the request data. OTT connection 4550 may transfer both the request data and the user data. Client application 4532 may interact with the user to generate the user data that it provides.

It is noted that host computer 4510, base station 4520 and UE 4530 illustrated in FIG. 22 may be similar or identical to host computer 4430, one of base stations 4412*a*, 4412*b*, 4412*c* and one of UEs 4491, 4492 of FIG. 21, respectively. This is to say, the inner workings of these entities may be as shown in FIG. 22 and independently, the surrounding network topology may be that of FIG. 21.

In FIG. 22, OTT connection 4550 has been drawn abstractly to illustrate the communication between host computer 4510 and UE 4530 via base station 4520, without explicit reference to any intermediary devices and the precise routing of messages via these devices. Network infrastructure may determine the routing, which it may be configured to hide from UE 4530 or from the service provider operating host computer 4510, or both. While OTT connection 4550 is active, the network infrastructure may further take decisions by which it dynamically changes the routing (e.g., on the basis of load balancing consideration or reconfiguration of the network).

Wireless connection 4570 between UE 4530 and base station 4520 is in accordance with the teachings of the embodiments described throughout this disclosure. One or more of the various embodiments may improve the performance of OTT services provided to UE 4530 using OTT connection 4550, in which wireless connection 4570 forms the last segment. More precisely, the teachings of these embodiments may improve the random access speed and/or reduce random access failure rates and thereby provide benefits such as faster and/or more reliable random access.

A measurement procedure may be provided for the purpose of monitoring data rate, latency and other factors on which the one or more embodiments improve. There may further be an optional network functionality for reconfiguring OTT connection 4550 between host computer 4510 and UE 4530, in response to variations in the measurement results. The measurement procedure and/or the network functionality for reconfiguring OTT connection 4550 may be implemented in software 4511 and hardware 4515 of host computer 4510 or in software 4531 and hardware 4535 of UE 4530, or both. In embodiments, sensors (not shown) may be deployed in or in association with communication devices through which OTT connection 4550 passes; the sensors may participate in the measurement procedure by supplying values of the monitored quantities exemplified above, or supplying values of other physical quantities from which software 4511, 4531 may compute or estimate the monitored quantities. The reconfiguring of OTT connection 4550 may include message format, retransmission settings, preferred routing etc.; the reconfiguring need not affect base station 4520, and it may be unknown or imperceptible to base station 4520. Such procedures and functionalities may be known and practiced in the art. In certain embodiments, measurements may involve proprietary UE signaling facilitating host computer 4510's measurements of throughput, propagation times, latency and the like. The measurements may be implemented in that software 4511 and 4531 causes messages to be transmitted, in particular empty or 'dummy' messages, using OTT connection 4550 while it monitors propagation times, errors etc.

Figure 23:
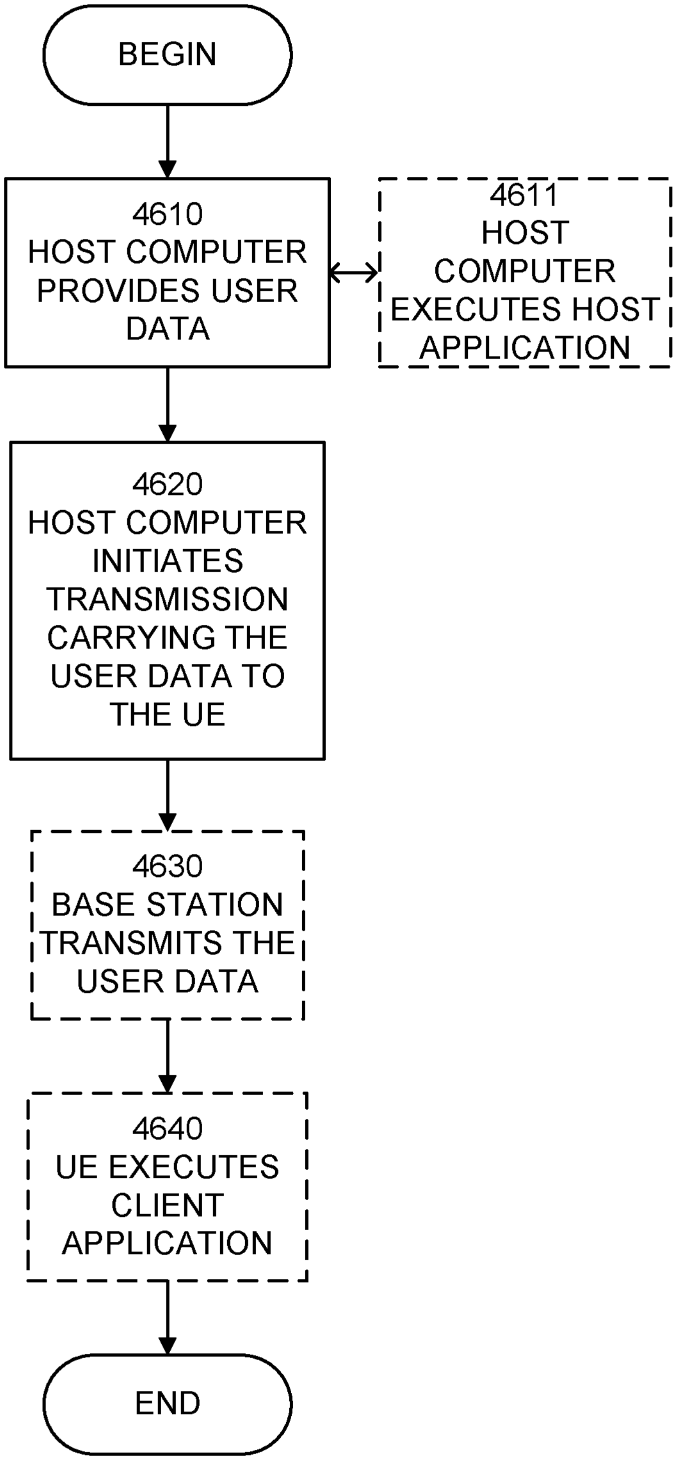
FIG. 23 is a block diagram of methods implemented in a communication system including a host computer, a base station and a user equipment in accordance with some embodiments.

FIG. 23 illustrates methods implemented in a communication system including a host computer, a base station and a user equipment in accordance with some embodiments.

FIG. 23 is a flowchart illustrating a method implemented in a communication system, in accordance with one embodiment. The communication system includes a host computer, a base station and a UE which may be those described with reference to FIGS. 21 and 22. For simplicity of the present disclosure, only drawing references to FIG. 23 will be included in this section. In step 4610, the host computer provides user data. In substep 4611 (which may be optional) of step 4610, the host computer provides the user data by executing a host application. In step 4620, the host computer initiates a transmission carrying the user data to the UE. In step 4630 (which may be optional), the base station transmits to the UE the user data which was carried in the transmission that the host computer initiated, in accordance with the teachings of the embodiments described throughout this disclosure. In step 4640 (which may also be optional), the UE executes a client application associated with the host application executed by the host computer.

Figure 24:
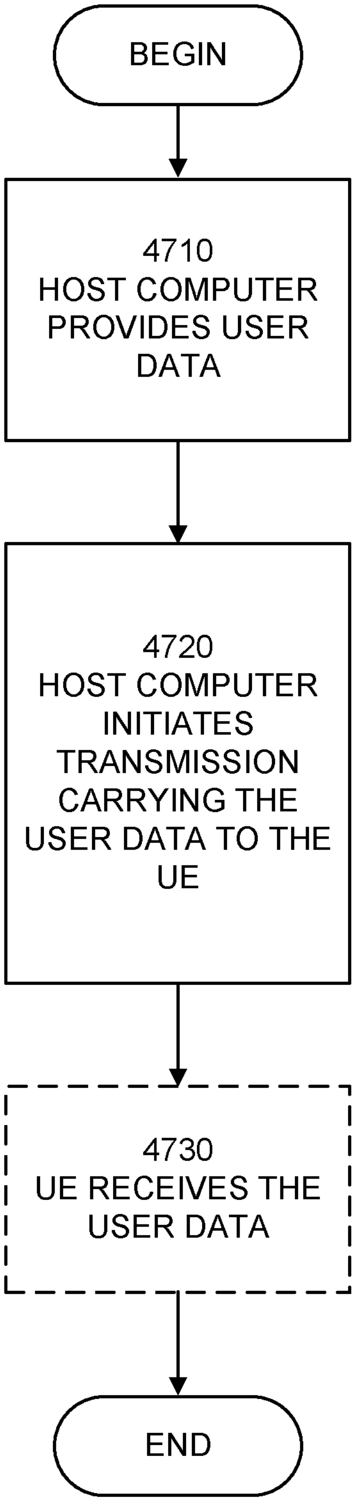
FIG. 24 is a block diagram of methods implemented in a communication system including a host computer, a base station and a user equipment in accordance with some embodiments.

FIG. 24 illustrates methods implemented in a communication system including a host computer, a base station and a user equipment in accordance with some embodiments.

FIG. 24 is a flowchart illustrating a method implemented in a communication system, in accordance with one embodiment. The communication system includes a host computer, a base station and a UE which may be those described with reference to FIGS. 21 and 22. For simplicity of the present disclosure, only drawing references to FIG. 24 will be included in this section. In step 4710 of the method, the host computer provides user data. In an optional substep (not shown) the host computer provides the user data by executing a host application. In step 4720, the host computer initiates a transmission carrying the user data to the UE. The transmission may pass via the base station, in accordance with the teachings of the embodiments described throughout this disclosure. In step 4730 (which may be optional), the UE receives the user data carried in the transmission.

Figure 25:
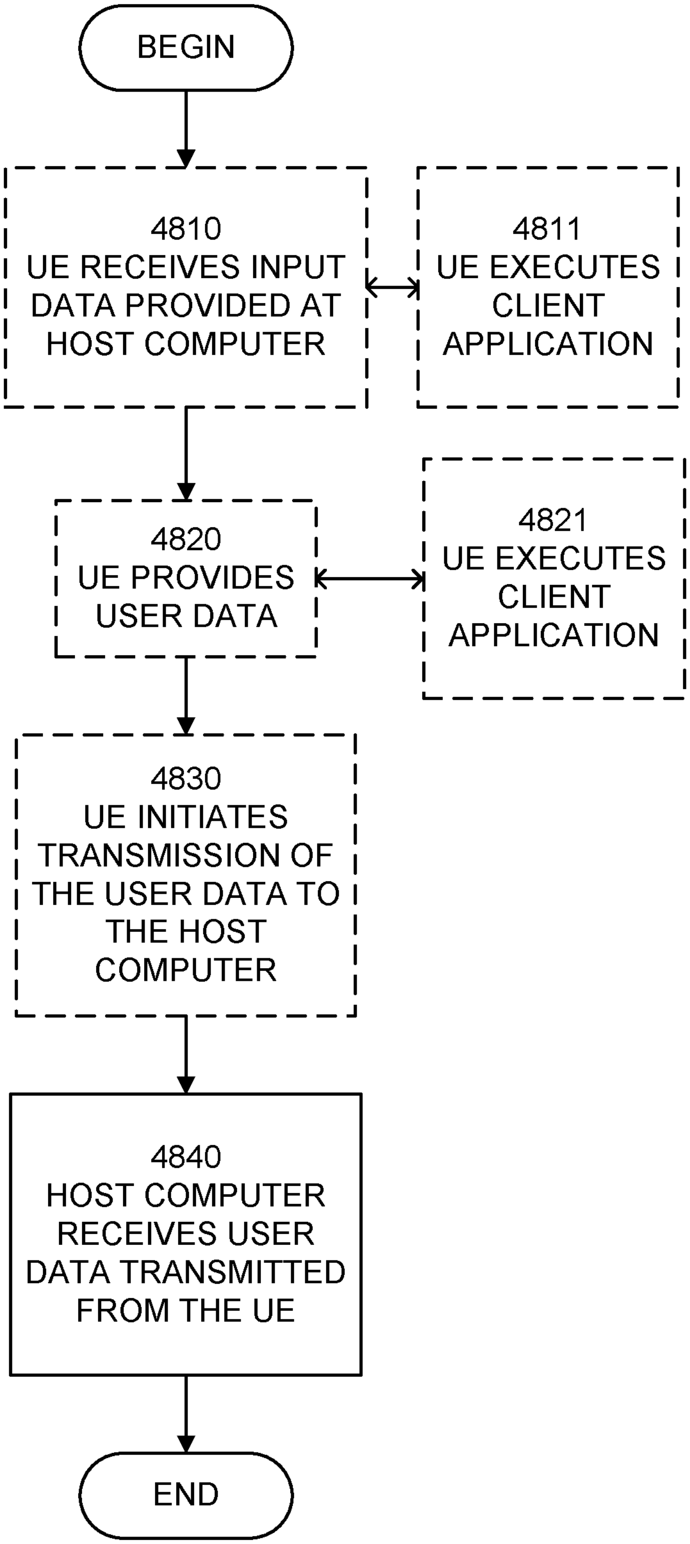
FIG. 25 is a block diagram of methods implemented in a communication system including a host computer, a base station and a user equipment in accordance with some embodiments.

FIG. 25 illustrates methods implemented in a communication system including a host computer, a base station and a user equipment in accordance with some embodiments.

FIG. 25 is a flowchart illustrating a method implemented in a communication system, in accordance with one embodiment. The communication system includes a host computer, a base station and a UE which may be those described with reference to FIGS. 21 and 22. For simplicity of the present disclosure, only drawing references to FIG. 25 will be included in this section. In step 4810 (which may be optional), the UE receives input data provided by the host computer. Additionally or alternatively, in step 4820, the UE provides user data. In substep 4821 (which may be optional) of step 4820, the UE provides the user data by executing a client application. In substep 4811 (which may be optional) of step 4810, the UE executes a client application which provides the user data in reaction to the received input data provided by the host computer. In providing the user data, the executed client application may further consider user input received from the user. Regardless of the specific manner in which the user data was provided, the UE initiates, in substep 4830 (which may be optional), transmission of the user data to the host computer. In step 4840 of the method, the host computer receives the user data transmitted from the UE, in accordance with the teachings of the embodiments described throughout this disclosure.

Figure 26:
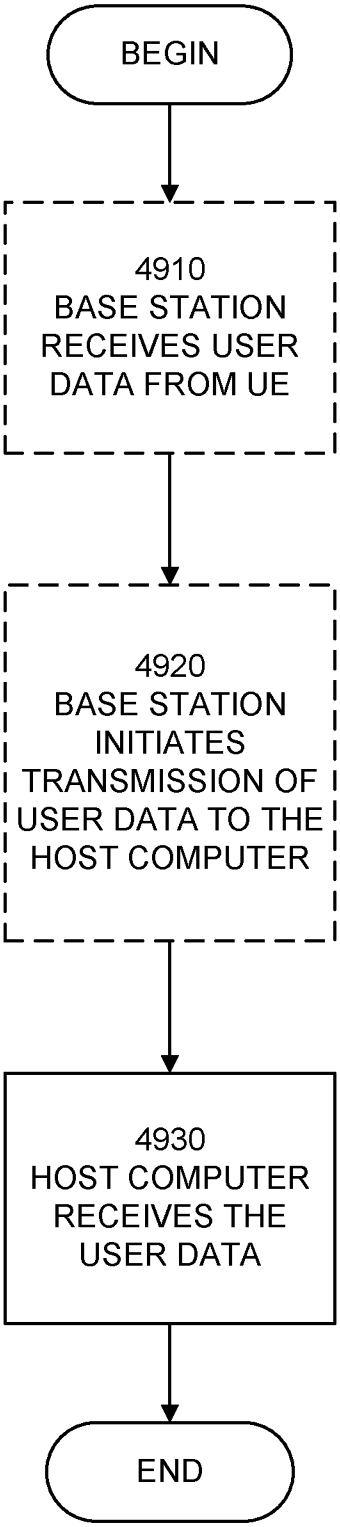
FIG. 26 is a block diagram of methods implemented in a communication system including a host computer, a base station and a user equipment in accordance with some embodiments.

FIG. 26 illustrates methods implemented in a communication system including a host computer, a base station and a user equipment in accordance with some embodiments.

FIG. 26 is a flowchart illustrating a method implemented in a communication system, in accordance with one embodiment. The communication system includes a host computer, a base station and a UE which may be those described with reference to FIGS. 21 and 22. For simplicity of the present disclosure, only drawing references to FIG. 26 will be included in this section. In step 4910 (which may be optional), in accordance with the teachings of the embodiments described throughout this disclosure, the base station receives user data from the UE. In step 4920 (which may be optional), the base station initiates transmission of the received user data to the host computer. In step 4930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Abbreviations

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1×Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" (abbreviated "/") includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method performed by a network function repository function (NRF) entity, the method comprising:

receiving a network function (NF) discovery request from an access and mobility management function (AMF) entity, the NF discovery request having a communication device identifier and a NF type identifier;

matching the communication device identifier with one of a plurality of communication device identifier ranges configured by the NRF entity;

extracting a group identifier, groupId, configured for the one of the pluralities of communication device identifier ranges;

building a list of registered NF profiles matching the NF type identifier and registered with the groupId;

transmitting the list of registered NF profiles including the groupId and a NRF mapping indication to the AMF entity;

receiving a groupId subscribe request from the AMF entity, the groupId subscribe request requesting that notifications be sent only from removed communication device ranges;

adding a communication device range to the groupId without providing a notification to the AMF entity; and responsive to removing a communication device range to the groupId, providing a notification to the AMF entity that includes the groupId, and an identification of the communication device range removed.

2. The method of claim 1 further comprising:

receiving a first registration, from a first network function, for a network function, NF, profile which includes the groupId, and the NRF mapping indication that the mapping of communication device identifier ranges to the groupId is performed by the NRF entity;

receiving a second registration, from a second network function, for a NF profile which includes the groupId, and the NRF mapping, wherein a NF type of the first network function is a different NF type than the NF type of the second network function/node; and publishing an indication towards a NF consumer indicating that further routing information can be provided related to a received communication device identifier.

3. The method of claim 1 wherein the communication device identity comprises a subscription permanent identifier, SUPI.

4. The method of claim 1, further comprising receiving a groupId discovery request from the AMF entity, the groupId discovery request including the groupId, the communication device identifier, and an indication that only communication device identifier ranges having the communication device identifier is to be provided; and providing a response to the AMF entity, the response including just the communication device identifier ranges matched to the communication device identifier.

5. A network function repository function, NRF, entity comprising:

processing circuitry; and memory coupled with the processing circuitry, wherein the memory includes instructions that when executed by the processing circuitry causes the NRF to perform operations comprising to:

receive a network function, NF, discovery request from an access and mobility management function, AMF, entity, the NF discovery request having a communication device identifier and a NF type identifier;

match the communication device identifier with one of a plurality of communication device identifier ranges configured by the NRF entity;

extract a group identifier, groupId, configured for the one of the pluralities of communication device identifier ranges;

build a list of registered NF profiles matching the NF type identifier and registered with the groupId;

transmit the list of registered NF profiles including the groupId and a NRF mapping indication to the AMF entity;

receive a groupId subscribe request from the AMF entity, the groupId subscribe request requesting that notifications be sent only from removed communication device ranges;

add a communication device range to the groupId without providing a notification to the AMF entity; and responsive to removing a communication device range to the groupId, provide a notification to the AMF entity that includes the groupId, and an identification of the communication device range removed.

6. A method performed by an access and mobility management function, AMF, entity, the method comprising:

responsive to receiving an initial registration request from a communication device, transmitting a network function, NF, discovery request to a network function repository function, NRF, entity, the NF discovery request comprising a communication device identifier and a NF type identifier;

receiving a list of registered NF profiles including the groupId and a NRF mapping indication indicating that the mapping of communication device identifier ranges to the groupId is performed by the NRF entity;

transmitting a groupId subscribe request to the NRF entity, the groupId subscribe request requesting that notifications be sent only from removed communication device ranges;

receiving a notification from the NRF entity that includes the groupId, and an identification of the communication device range removed; and removing the communication device range from the groupId in cache memory.

7. The method of claim 6, further comprising:

storing the groupId associated to the communication device identifier as part of AMF context data for the communication device.

8. The method of claim 6, further comprising:

receiving a registration request from a second communication device, the registration request including a second communication device identifier identifying the second communication device;

performing a lookup in the cache memory for the second communication device identifier;

responsive to finding a match in one of one or more communication device ranges in the cache memory, selecting a unified data management, UDM, function entity belonging to the groupID for the one of the one or more communication device ranges for the second communication device.

9. The method of claim 6 wherein the communication device identifier is a subscription permanent identifier, SUPI.

* * * * *